(12) United States Patent
Suzuki

(10) Patent No.: US 12,521,979 B2
(45) Date of Patent: Jan. 13, 2026

(54) IMAGE PROCESSING APPARATUS, MEDIUM, AND METHOD

(71) Applicant: BROTHER KOGYO KABUSHIKI KAISHA, Nagoya (JP)

(72) Inventor: Shuhei Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 245 days.

(21) Appl. No.: 18/064,411

(22) Filed: Dec. 12, 2022

(65) Prior Publication Data

US 2023/0202164 A1 Jun. 29, 2023

(30) Foreign Application Priority Data

Dec. 28, 2021 (JP) ................. 2021-215048

(51) Int. Cl.
*B41J 2/21* (2006.01)
*B41J 2/045* (2006.01)

(52) U.S. Cl.
CPC ....... *B41J 2/04508* (2013.01); *B41J 2/04586* (2013.01); *B41J 2/2103* (2013.01)

(58) Field of Classification Search
CPC .......... B41J 2/2132; B41J 2/21; B41J 2/2135
See application file for complete search history.

(56) References Cited

U.S. PATENT DOCUMENTS

| 9,566,799 B1* | 2/2017 | Barkley | ................. B41J 19/145 |
| 2019/0009523 A1 | 1/2019 | Morikawa | |
| 2019/0291485 A1 | 9/2019 | Arakane | |
| 2020/0156385 A1 | 5/2020 | Arakane et al. | |
| 2020/0293842 A1* | 9/2020 | Morikawa | .......... G06K 15/1857 |
| 2021/0037165 A1* | 2/2021 | Morikawa | ............ H04N 1/6072 |
| 2021/0229456 A1 | 7/2021 | Arakane et al. | |

FOREIGN PATENT DOCUMENTS

| JP | H05-57909 A | 3/1993 |
| JP | 2006-168052 A | 6/2006 |
| JP | 2019014121 A | 1/2019 |
| JP | 2019166802 A | 10/2019 |
| JP | 2020082424 A | 6/2020 |
| JP | 2021-24084 A | 2/2021 |
| JP | 2021115808 A | 8/2021 |

* cited by examiner

*Primary Examiner* — Scott A Richmond
(74) *Attorney, Agent, or Firm* — Scully, Scott, Murphy & Presser, P.C.

(57) ABSTRACT

There is provided an image processing apparatus for a print executor, including a controller configured to execute direction determining processing. The direction determining processing including: determining whether a specified condition including a first condition is satisfied, the first condition indicating color difference pixels are present in a first partial image and an intermediate image, as well as the color difference pixels are present in a second partial image and the intermediate image; determining direction of head movement in the first partial printing and direction of head movement in the second partial printing to be same as each other in a case that the specified condition is satisfied, and determining the direction of the head movement in the second partial printing to be opposite to the direction of the head movement in the first partial printing in a case that the specified condition is not satisfied.

10 Claims, 11 Drawing Sheets

IMAGE PROCESSING APPARATUS, MEDIUM, AND METHOD

REFERENCE TO RELATED APPLICATIONS

This application claims priority from Japanese Patent Application No. 2021-215048 filed on Dec. 28, 2021. The entire content of the priority application is incorporated herein by reference.

BACKGROUND ART

There is a known multifunction peripheral which prints an image by printing a plurality of band images. In an example of this technique, a determination is made as to whether or not a first color condition is satisfied, the first color condition indicating that a difference (color difference) between a color to be printed in a presumed case that an object band image (target band image) is printed in a forward direction and a color to be printed in another presumed case that the object band image is printed in a reverse direction is great. In a case that the first color condition is satisfied, another determination is made as to whether or not a second color condition is satisfied, the second color condition indicating that a pixel of a color, having the above-described great color difference, included in the object band image are also included in another band image as much as not less than a predetermined number (quantity). In a case that the first color condition and the second color condition are satisfied, the object band image and the another band image are printed in a same print direction. With this, the occurrence of such a situation that the color difference, due to mutually different print directions, becomes conspicuous may be suppressed.

DESCRIPTION

Japanese Patent Application Laid-open No. 2019-14121, however, does not consider such a printing that has an image printed by both of a first partial printing and a second partial printing, between an image printed by the first partial printing and an image printed by the second partial printing.

The present specification discloses a technique capable of suppressing the occurrence of such a situation that the color difference becomes to be conspicuous, in the printing having an image printed by both of a first partial printing and a second partial printing, between an image printed by the first partial printing and an image printed by the second partial printing.

The technique disclosed in the present specification can be realized as following examples.

According to a first aspect of the present disclosure, there is provided an image processing apparatus for a print executor having a head, the head including a first nozzle configured to discharge a first ink and a second nozzle configured to discharge a second ink, a kind of the first ink and a kind of the second ink being different from each other, a position of the first nozzle in a first direction and a position of the second nozzle in the first direction being different from each other, the print executor being configured to perform a printing by repeatedly executing a partial printing and a medium conveyance, the partial printing including forming a dot on a print medium by the head while performing a head movement of moving the head relative to the print medium in the first direction or in a second direction opposite to the first direction, the medium conveyance including conveying the print medium relative to the head in a medium conveyance direction crossing the first direction, the image processing apparatus including a controller configured to execute:

an image obtaining processing of obtaining an object image data indicating an object image;

a direction determining processing of determining, based on the object image data indicating the object image, a direction of the head movement in each of a plurality of times of the partial printing including a first partial printing and a second partial printing to be executed after the first partial printing to be the first direction or the second direction; and a print control processing of causing the print executor to print the object image by causing the print executor to execute the plurality of times of the partial printing based on the object image data, the direction of the head movement in each of the plurality of times of the partial printing being the direction determined by the direction determining processing, wherein;

the object image includes a first partial image to be printed by the first partial printing, a second partial image to be printed by the second partial printing, and an intermediate image positioned between the first partial image and the second partial image, the intermediate image being to be printed by both of the first partial printing and the second partial printing;

the direction determining processing including:

determining whether a specified condition including at least a first condition is satisfied, the first condition indicating that color difference pixels are present in both of the first partial image and the intermediate image, as well as the color difference pixels are present in both of the second partial image and the intermediate image;

determining the direction of the head movement in the first partial printing and the direction of the head movement in the second partial printing to be same as each other in a case that the specified condition is satisfied, and determining the direction of the head movement in the second partial printing to be opposite to the direction of the head movement in the first partial printing in a case that the specified condition is not satisfied, each of the color difference pixels is a pixel having large difference between a color printed by the partial printing while moving the head in the first direction and a color printed by the partial printing while moving the head in the second direction, compared to pixel different from the color difference pixels.

According to the above-described configuration, in a case that the specified condition is satisfied, the specified condition indicating that the color difference pixels are present straddling the boundary between the first partial image and the intermediate image (the color difference pixels are present in both of the first partial image and the intermediate image) and that the color difference pixels are present straddling a boundary between the second partial image and the intermediate image (the color difference pixel are present in both of the second partial image and the intermediate image), the moving direction of the head movement in the first partial printing and the moving direction of the head movement in the second partial printing are determined to be the same direction. As a result, in the printing having an image printed by both of a first partial printing and a second partial printing, between an image printed by the first partial printing and an image printed by the second partial printing, it is possible to suppress the occurrence of such a situation that the color difference becomes to be conspicuous. Further, in the case that the specified condition is not satisfied, the moving direction of the head movement in the first partial printing and the moving direction of the head movement in the second partial printing are determined to be the mutually different directions. As a result, in the printing having an image printed by both of a first partial printing and a second partial printing, between an image printed by the first partial printing and an image printed by the second partial printing, it is possible to suppress an occurrence of such a situation that the printing speed is lowered.

Note that the technique disclosed in the present specification can be realized in a variety of kinds of aspects, which include, for example, a printing apparatus, a method of controlling the printing apparatus, an image processing method, a computer program configured to realize a function of these apparatuses and methods, a recording medium storing the computer program, etc.

A: FIRST EMBODIMENT

A-1: Configuration of Printer 200

Figure 1:
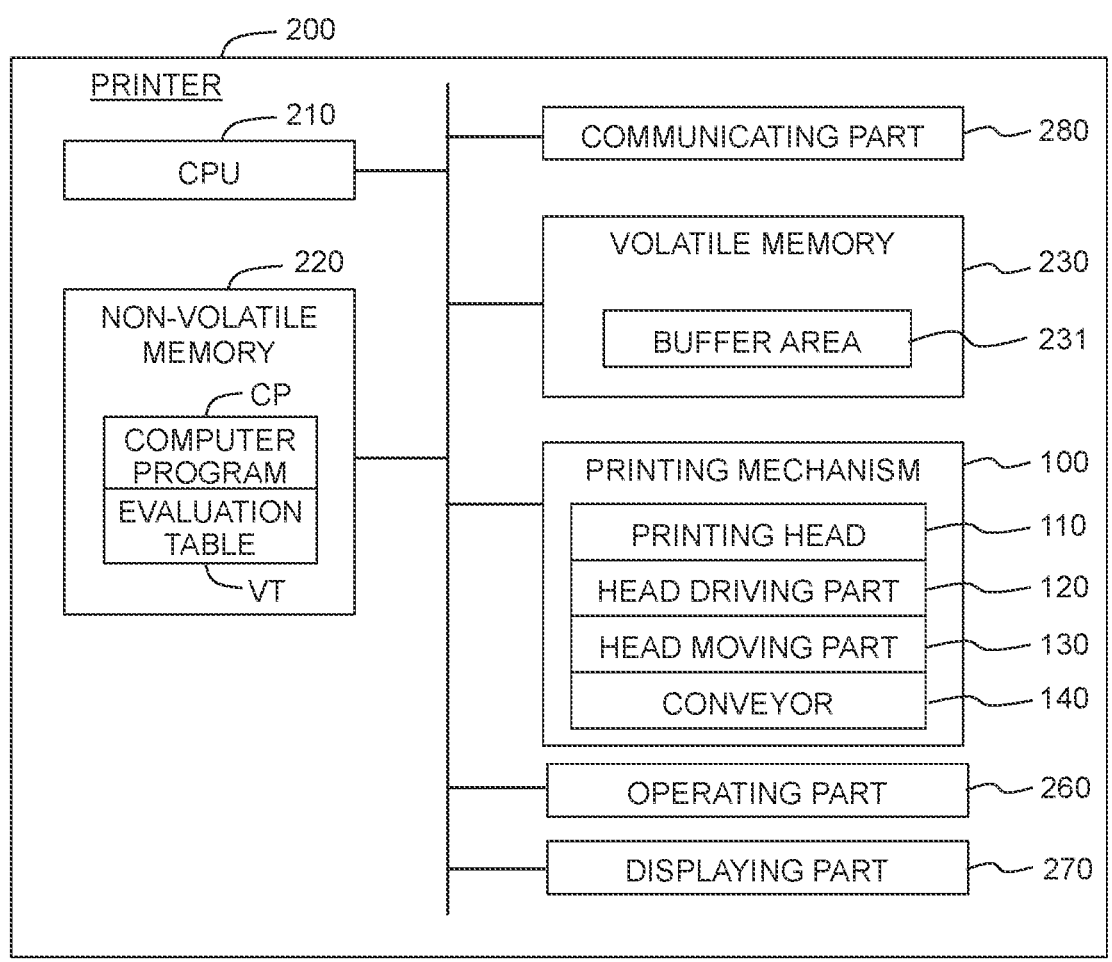
FIG. 1 is a block diagram depicting the configuration of a printer 200.

Next, an embodiment of the present disclosure will be explained, based on an example. FIG. 1 is a block diagram depicting the configuration of an embodiment.

A printer 200 includes, for example, a printing mechanism 100 as a print executing part (print executor), a CPU 210 as a controller for the printing mechanism 100, a non-volatile memory 220 such as a hard disk drive, etc., a volatile memory 230 such as a hard disk, a flash memory, etc., an operating part 260 such as a button, a touch panel, etc., via which an operation from a user is obtained, a displaying part 270 such as a liquid crystal display, etc., and a communicating part 280. The printer 200 is connected to an external apparatus, such as, for example, a terminal apparatus (not depicted in the drawings) of the user, via the communicating part 280 so that the printer 200 can communicate with the external apparatus.

The volatile memory 230 provides a buffer area 231 which temporarily stores various kinds of intermediate data generated in a case that the CPU 210 performs a processing. A computer program CP and an evaluation table VT are stored in the non-volatile memory 220. In the present embodiment, the computer program CP is a control program for controlling the printer 200. The evaluation table VT will be described later.

The computer program CP and the evaluation table VT may be provided by being stored in the non-volatile memory 220 at a time of shipment of the printer 200. Alternatively, the computer program CP and the evaluation table VT may be provided in an aspect in which the computer program CP and the evaluation table VT are downloaded from a server. Still alternatively, instead of this, the computer program CP and the evaluation table VT may be provided in an aspect in which the computer program CP and the evaluation table VT are stored in a DVD-ROM, etc. The CPU 210 executes the computer program CP so as to, for example, control the printing mechanism 100, thereby executing a printing processing (to be described later on).

The printing mechanism 100 is configured to discharge or eject inks (liquid droplets) of respective colors which are cyan (C), magenta (M), yellow (Y), and black (K) to thereby perform printing. The printing mechanism 100 includes a printing head (head) 110, a head driving part 120, a head moving part 130, and a conveyor 140.

Figure 2A:
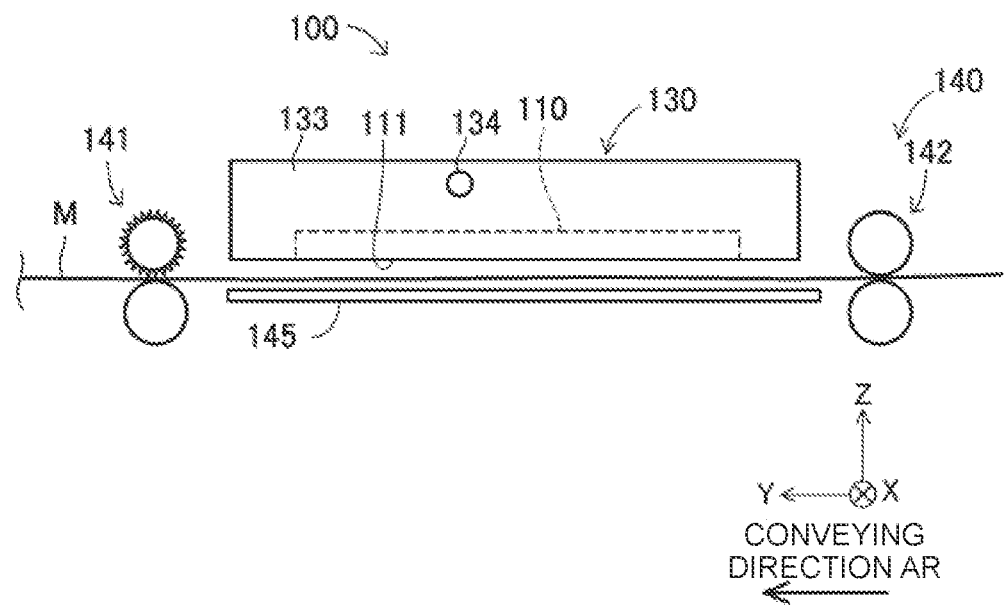
FIGS. 2A and 2B are each a view depicting the schematic configuration of a printing mechanism 100.
Figure 2B:
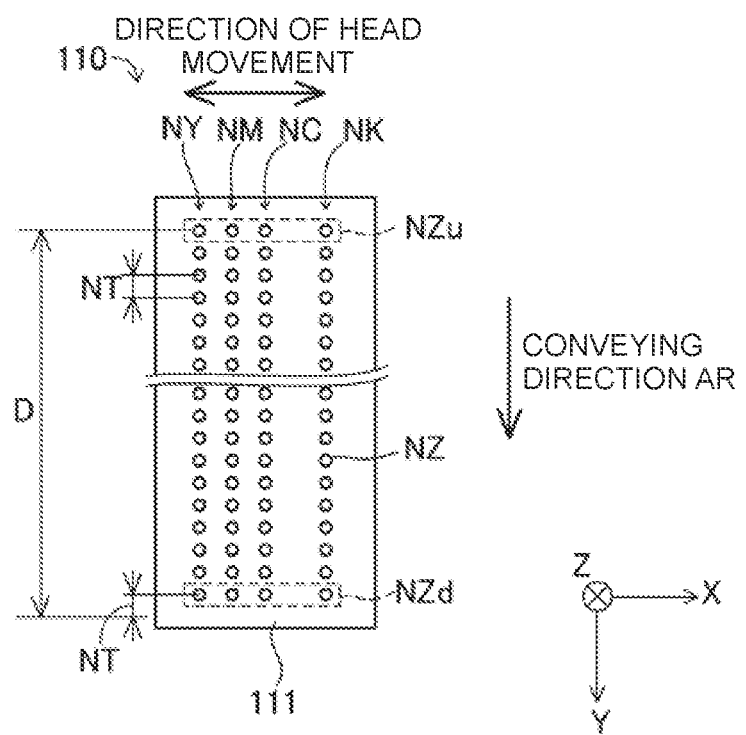

FIGS. 2A and 2B are each a view depicting the schematic configuration of the printing mechanism 100. As depicted in FIG. 2A, the head moving part 130 includes a carriage 133 and a sliding shaft 134. The carriage 133 has the printing head 110 mounted or installed therein. The sliding shaft 134 holds the carriage 133 so that the carriage 133 can reciprocate in a head moving direction (X axis direction in FIG. 2A). The head moving part 130 uses power of a motor (not depicted in the drawings) to thereby cause the carriage 133 to reciprocate along the sliding shaft 134. This realizes head movement in which the printing head 110 is caused to reciprocate in the head moving direction with respect to a sheet M (paper sheet M, paper M).

The conveyor 140 conveys the sheet M in a conveying direction AR (+Y direction in FIGS. 2A and 2B) crossing the head moving direction of the head movement while holding the sheet M. As depicted in FIG. 2A, the conveyor 140 includes a sheet table 145, an upstream roller pair 142 and a downstream roller pair 141. In the following description, an upstream side (−Y side) in the conveying direction AR is simply referred also to as an "upstream side", and a downstream side (+Y side) in the conveying direction AR is simply referred also to as a "downstream side".

The upstream roller pair 142 holds the sheet M on the upstream side (−Y side) with respect to the printing head 110, and the downstream roller pair 141 holds the sheet M on the downstream side (+Y side) with respect to the printing head 110. The sheet table 145 is arranged at a location which is between the upstream roller pair 142 and the downstream roller pair 141 and at which the sheet table 145 faces or is opposite to a nozzle formation surface 111 of the printing head 110. The downstream roller pair 141 and the upstream roller pair 142 are driven by a conveyance motor (not depicted in the drawings) to thereby convey the sheet M.

The head driving part 120 (FIG. 1) supplies a driving signal to the printing head 110 while the head moving part 130 performs the movement of the printing head 110, thereby driving the printing head 110. The printing head 110 forms dots by ejecting or discharging the ink(s) on the sheet M, which is conveyed by the conveyor 140, in accordance with the driving signal.

FIG. 2B depicts the configuration of the printing head 110 as being seen from a −Z side (lower side in FIG. 2A). As depicted in FIG. 2B, a plurality of nozzle rows or arrays formed of a plurality of nozzles, that is, a plurality of nozzle rows NC, NM, NY, NK from which the inks of C, M, Y, K are ejected or discharged, respectively, are formed in the nozzle formation surface 111 of the printing head 110. Each of the plurality of nozzle rows include a plurality of nozzle NZ which are aligned (arranged side by side) in the conveying direction AR. The plurality of nozzles NZ have positions which are mutually different in the conveyance direction AR (+Y direction); and the plurality of nozzles NZ are arranged side by side in the conveying direction AR at a predefined nozzle interval NT therebetween. The nozzle interval NT is a length in the conveying direction AR between two nozzles NZ which are included in the plurality of nozzles NZ and which are adjacent to each other in the conveying direction AR. Among the plurality of nozzles NZ forming each of the plurality of nozzle rows, a nozzle NZ which is positioned at the upstream-most side (−Y side) is also referred to as an upstream-most nozzle NZu. Among the plurality of nozzles NZ forming each of the plurality of nozzle rows, a nozzle NZ which is positioned at the downstream-most side (+Y side) is also referred to as a downstream-most nozzle NZd. A length obtained by adding the nozzle interval NT to a length in the conveying direction AR from the upstream-most nozzle NZu to the downstream-most nozzle NZd is also referred to as a nozzle length D.

The positions in the head moving direction (X direction in FIG. 2B) of the nozzle rows NC, NM, NY, NK are different from one another; the positions in the conveying direction AR (Y direction in FIG. 2B) of the nozzle rows NC, NM, NY, NK overlap with one another. In an example depicted in FIG. 2B, for example, the nozzle row NM from which M ink is discharged is arranged in the positive direction side of the X direction with respect to the nozzle row NY from which Y ink is discharged.

A-2: Overview of Printing

The printing mechanism 100 performs a partial printing of forming dots on the sheet M by the printing head 110 while performing the head movement by the head moving part 130 and conveyance of the sheet M (hereinafter referred also to as "sheet conveyance") by the conveyor 140 alternately a plurality of times to thereby print a print image PI on the sheet M. In one time of the partial printing (one partial printing), in a state that the sheet M is stopped on the sheet table 145, an ink(s) is (are) discharged or ejected from the nozzles NZ of the printing head 110 onto the sheet M while performing one time of the head movement, thereby printing a part of the image, which is to be printed, on the sheet M. One time of the sheet conveyance is a conveyance in which the sheet M is conveyed in the conveyance direction AR by an amount corresponding to a predetermined conveying amount. In the present embodiment, the CPU 210 causes the printing mechanism 100 to execute m times (m is an integer not less than 2 (two)) of the partial printing.

Figure 3:
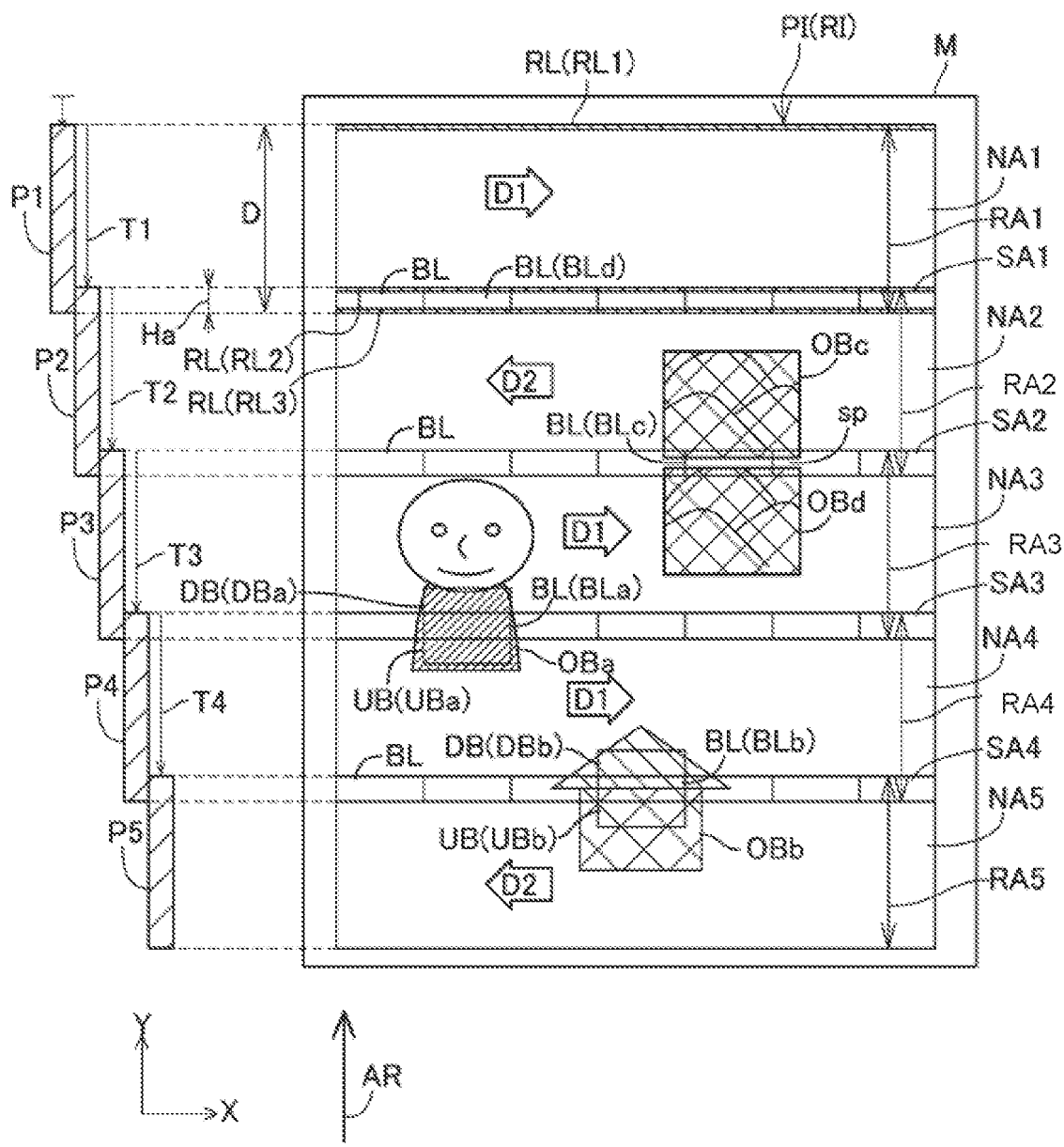
FIG. 3 is a view depicting an example of a print image PI to be printed on a sheet M.

FIG. 3 depicts an example of a print image PI to be printed on the sheet M. The print image PI includes a plurality of raster lines RL (e.g., RL1 in FIG. 3) which extends in the X direction in FIG. 3 (the head moving direction at the time of printing) and of which positions in the Y direction are mutually different. Each of the raster lines RL is a line in which a plurality of dots may be formed. Each of the raster lines of the print image PI correspond on one-to-one basis with respect to respective raster lines of an RGB image RI which will be described later on.

In the example depicted in FIG. 3, the print image PI is printed by five times of the partial printing (m=5). Further, in FIG. 3, a head position, namely, a relative position in the conveying direction AR of the printing head 110 with respect to the sheet M is depicted per each of the partial printing (i.e., per each of the head movements). A pass number k (k being an integer in a range from not less than 1 one to not more than "m") is assigned with respect to a plurality of times of the partial printing (the partial printing which are to be performed a plurality of times), in an execution order for executing the plurality of times of the partial printing; the head position P in a case that a k-th partial printing is to be performed is referred to as a head position Pk. Furthermore, the sheet conveyance performed between the k-th partial printing and a (k+1)-th partial printing is referred to as a k-th sheet conveyance Tk. FIG. 3 depicts head positions P1 to P5 and sheet conveyances T1 to T4.

Note that in FIG. 3, the print image PI formed on the sheet M includes a plurality of ordinary areas NA1 to NA5 and a plurality of overlap areas SA1 to SA4.

Each of the plurality of ordinary areas NA1 to NA5 is an area in which each of the respective raster lines RL within the area is printed only by one time of partial printing (partial printing performed once). For example, in each of the raster lines RL in an ordinary area NAk in FIG. 3, the dots are formed only by the k-th partial printing, namely, the partial printing performed at the head position Pk. In each of the raster lines RL in the ordinary area NAk, the dots are not formed by the (k+1)-th partial printing or by a (k−1)-th partial printing. Accordingly, the dots of the specified color, for example, dots of C of each of the raster lines RL in the ordinary area NAk are formed by one nozzle included in the nozzles forming the nozzle row NC and corresponding to said raster line RL.

Each of the plurality of overlap areas SA is an area in which each of the respective raster lines RL within the area is printed by two times of partial printing (partial printing performed twice). For example, in each of the raster lines RL in the overlap area SAk in FIG. 3, the dots are formed by the k-th partial printing and the (k+1)-th partial printing. Namely, in each of the raster lines RL in the overlap area SAk, the dots are formed by the partial printing performed at the head position PK, and by the partial printing performed at the head position P(k+1). Accordingly, the dots of the specified color, for example, dots of C of the raster line RL in each of the overlap areas SAk are formed by two nozzles included in the nozzles forming the nozzle row NC and corresponding to said raster line RL. The two nozzles corresponding to the raster line RL in the overlap area SAk are a nozzle corresponding to said raster line RL in the partial printing which is performed at the head position Pk and a nozzle corresponding to the raster line RL in the partial printing which is performed at the head position P(k+1).

The overlap area SAk is positioned between the ordinary area NAk and the ordinary area NA(k+1). A length Ha in the conveyance direction AR of the overlap area SA (also referred to as a "overlap area length Ha") is a length corresponding, for example, to about a several pieces of the raster line RL to about several ten (dozen) pieces of the raster line RL.

Note that as depicted in FIG. 3, a partial area RA1 which is printable by a partial printing performed first (first partial printing) includes an overlap area SA1 including an upstream end of the partial area RA1, and an ordinary area NA1 which is on the downstream side of the overlap area SA1. Partial areas RA2 to RA4 which are printable by partial printings performed second to fourth (second to fourth partial printings), respectively, each include: an overlap area SAk including an upstream end of a partial area RAk, an overlap area SA(k−1) including a downstream end of the partial area RAk, and an ordinary area NAk located on the downstream side of the overlap are SAk and on the upstream side of the overlap area SA(k−1) (k being any one of 2 to 4). A partial area RA5 which is printable by a partial printing performed last (last partial printing) includes the overlap area SA4 including a downstream end of the partial area RA5, and the ordinary area NA5 located on the upstream side of the overlap area SA4.

The reason for providing the overlap areas SA is explained below. It is assumed that a printing image is formed only by images printed in the ordinary areas, without providing the overlap areas SA. In this case, an inconvenience which is referred to as a so-called banding may occur. In banding, a white streak and/or a black streak arises at a boundary between two ordinary areas adjacent to each other in the conveyance direction AR, due to any variation in the conveyance amount of the sheet M, etc. The banding lowers the image quality of the print image PI. By providing the overlap area SA between two pieces of the ordinary area NA and by printing the image on the overlap area SA, it is possible to suppress the occurrence of the inconvenience referred to as the banding as described above. Since the dots on one raster line RL in the overlap area SA are formed by the partial printing performed twice (two partial printings), it is possible to suppress such a situation that all the dots on a certain one raster line RL are deviated uniformly with respect to all the dots on another raster line different from the certain raster line.

Figure 4:
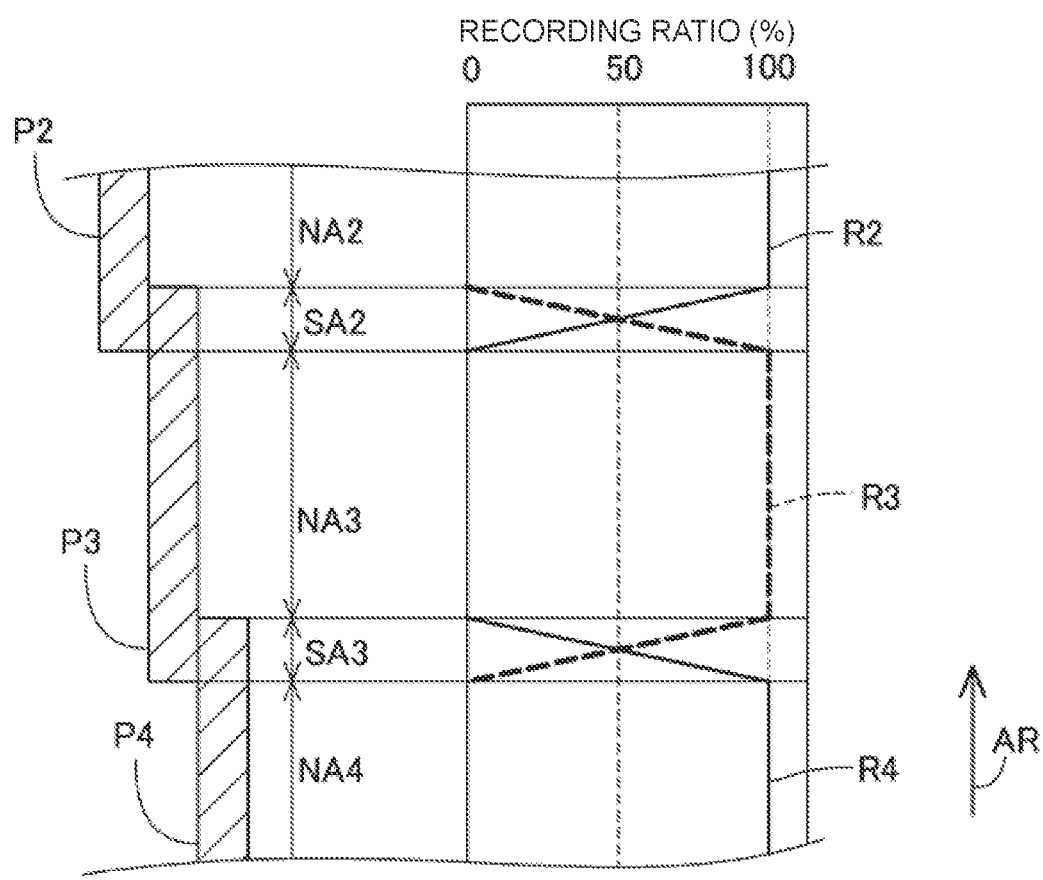
FIG. 4 is a view explaining a recording ratio of a partial printing.

FIG. 4 is a view explaining a recording ratio of a partial printing. Recording ratios R2, R3 and R4 in FIG. 4 are recording ratios of the partial printings at the head positions P2, P3 and P4, respectively. FIG. 4 indicates the respective recording ratios R2, R3 and R4 with respect to positions in the conveyance direction AR, respectively. In a range in the conveyance direction AR corresponding to the ordinary area NA2, the recording ratio R2 is 100%. Similarly, in ranges in the conveyance direction AR corresponding to the ordinary areas NA3 and NA4, respectively, the recording ratios R3 and R4 are each 100%.

In a range in the conveyance direction AR corresponding to the overlap area SA2, the recording ratio R2 is linearly reduced toward the upstream side (the lower side in FIG. 4) of the conveyance direction AR. In the range in the conveyance direction AR corresponding to the overlap area SA2, the recording ratio R3 is linearly reduced toward the downstream side (the upper side in FIG. 4) of the conveyance direction AR. In the range in the conveyance direction AR corresponding to the overlap area SA2, a sum of the recording ratio R2 and the recording ratio R3 is 100%. This is similarly applicable also to the recording ratios R3 and R4 in ranges in the conveyance direction AR corresponding to the overlap area SA3.

Note that although FIG. 4 depicts the recording ratios regarding only the partial printings at the head positions P2 to P4, the recording ratios are same as or similar to those as described above, also in the head positions P1 and P5 which are different from the head positions P2 to P4. With this, it is possible to perform printing at the recording ratio of 100% in each of the ordinary areas NA1 to NA5 and in each of the overlap areas SA1 to SA4. In such a manner, by changing the recording radio depending on the position in the conveying direction AR in the overlap area SA, it is possible to effectively suppress such a situation that the banding becomes conspicuous.

The print direction in each of the partial printings in FIG. 3 is either one of a forwarding route direction D1 and a returning route direction D2. Namely, the partial printing is either one of a forwarding route printing of forming dots while performing the head movement in the forwarding route direction D1 (+X direction in FIG. 3) and a returning route printing of forming dots while performing the head movement in the returning route direction D2 (−X direction in FIG. 3). In the following description, the head movement direction in a case that the partial printing is performed is also referred to as a print direction (the forwarding route direction D1 or the returning route direction D2). In FIG. 3, within each of the partial areas RA1 to RA5, the print direction of the partial printing for printing each of the partial areas RA1 to RA5 is indicated.

In the present embodiment, the printing is performed by using all the nozzles corresponding to the nozzle length D. Accordingly, the conveyance amount of the sheet conveyance of each of the sheet conveyances T1 to T4 is defined as a value obtained by subtracting the overlap area length Ha from the nozzle length D, that is (D-Ha).

In a case that the partial printings in a same print direction are continuously performed, for example, in a case that the forwarding route printings are continuously performed, the head movement is performed between the two partial printings, without forming the dots. The head movement which is performed without forming the dots in this manner (namely, without printing a partial image) is also referred to as a non-print head movement. For example, in the example depicted in FIG. 3, since both of the third partial printing and the fourth partial printing are the forwarding route printing, the non-print head movement is performed between the third partial printing and the fourth partial printing.

In contrast to this, in a case that the two continuous partial printings are performed in mutually different print directions, for example, in a case that the returning route printing is performed after the forwarding route printing, the non-printing head movement is not performed between the two partial printings. For example, in the example depicted in FIG. 3, since the first partial printing is the forwarding route printing and the second partial printing is the returning route printing, the non-print head movement is not performed between the first and second partial printings. In view of the printing speed, it is desired that the two continuous partial printings are performed in the mutually different print directions.

In this context, as depicted in FIG. 2B, the nozzle rows NC, NM, NY, NK for the four colors, respectively, (namely, for CMYK, respectively) have mutually different positions in the print direction (the moving direction of the head movement) in the head 110. On this account, in a case that the respective dots of CMYK are formed at a same position on the printing paper M, the order of formation of the dots differs between the forwarding route printing and the returning route printing. For example, in the example depicted in FIG. 2B, the dots are formed in an order of K, C, M, Y in the forwarding route printing, and the dots are conversely formed in an order of Y, M, C, K in the returning route printing. As a result, the order of overlap of the dots differs between an image which is printed by the forwarding route printing (also referred to as a "forwarding route print image") and an image which is printed by the returning route printing (also referred to as a "returning route print image"), in an area in which the dots of a plurality of colors are overlapped with each other. On this account, a tone (tint, color) of the printed color mutually differs, in some cases, between the forwarding route print image and the returning route print image, even in a case that the printings are mutually performed by using the same dot data. The color difference, which is generated between the forwarding route print image and the returning route print image as described above, is referred to as "color difference between the forwarding route printing and the returning route printing" as well. In a case that all the partial printings are performed in the same direction, for example, in a case that all the partial printings are the forwarding route printings, the color difference between the forwarding route printing and the returning route printing does not occur. Accordingly, in the viewpoint of the image quality, it is desired that all the partial printings are performed in the same direction.

In the present embodiment, although the details thereof will be described later on, the two continuous partial printings are performed, in principle, in the mutually different directions; in a case that a specified condition is satisfied, the two continuous partial printings are performed in the same direction. With this, the printing speed and the image quality are both realized.

A-3: Evaluation Table VT

Figure 5:
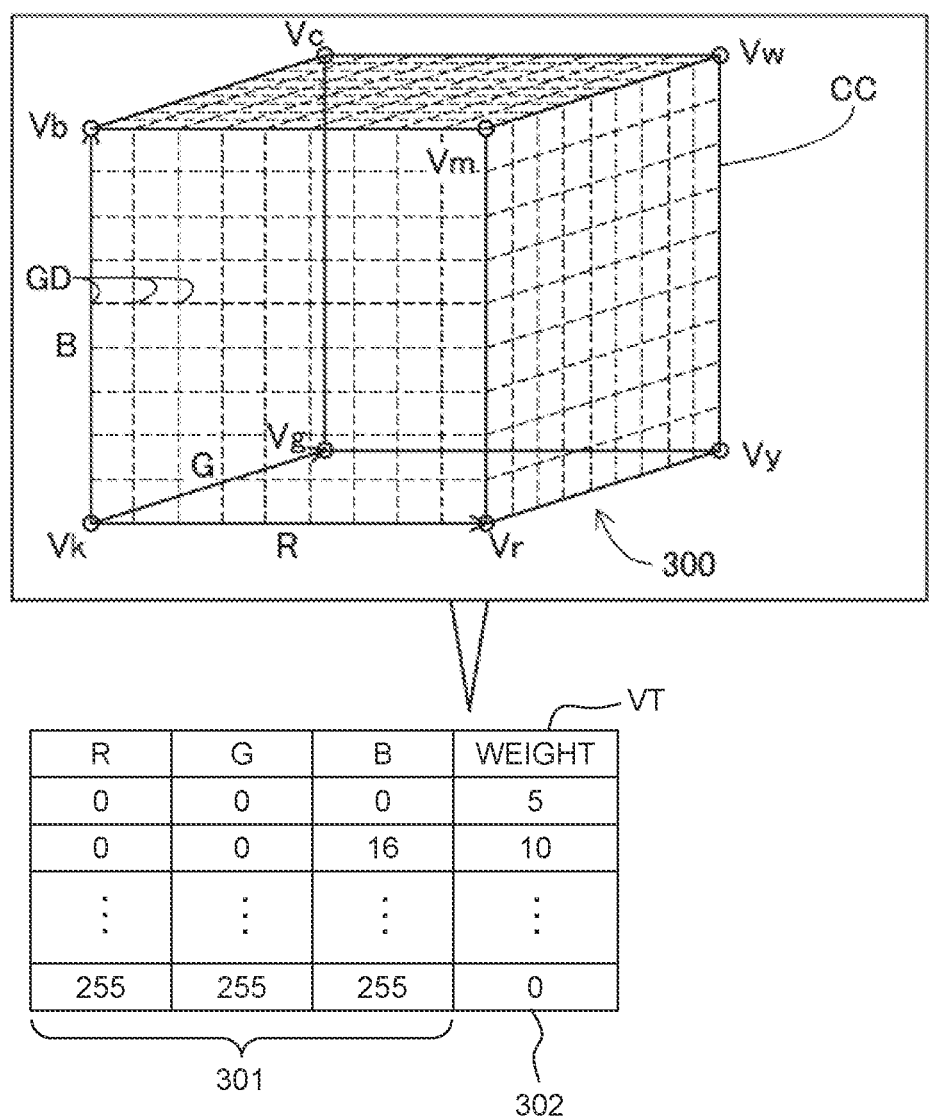
FIG. 5 is a view explaining an evaluation table VT.

FIG. 5 is a view explaining the evaluation table VT (FIG. 1). An upper part of FIG. 5 indicates a RGB color space CC as a color space of the RGB color system which includes three component values that are red (R), green (G), and blue (B). Reference each indicating a color are affixed to eight apexes of the RGB color space CC (specifically, a black apex Vk (0, 0, 0), a red apex Vr (255, 0, 0), a green apex Vg (0, 255, 0), a blue apex Vb (0, 0, 255), a cyan apex Vc (0, 255, 255), a magenta apex Vm (255, 0, 255), a yellow apex Vy (255, 255, 0) and a white apex Vw (255, 255, 255). The numbers inside the parenthesis indicate values of the respective color components of (R, G, B). The value of R in each grid GD is any one of Q+1 pieces of values which are obtained by dividing the range of R (here, in a range of 0 to 255) with Q. This is similarly applicable to the respective values of green G and blue B in each grid GD. In the present embodiment, since Q=9, the cube of 9 pieces (729 pieces) of grid GD are set in the RGB color space CC.

A lower part of FIG. 5 indicates an example of the evaluation table VT. The evaluation table VT depicts a correspondence (corresponding relationship) between a color value (also referred to as an "RGB value") 301 of the RGB color system, and a weight 302. The respective component values of the RGB value are gradation values of 256 gradations. The RGB value 301 indicates the RGB value of each of the plurality of grids GD as described above. The weight 302 indicates an extent of the color difference between the forwarding route printing and the returning route printing. As a weight 302 corresponding to a certain RGB value 301 is greater, the extent of the color difference between the forwarding route printing and the returning route printing is greater. Namely, as the weight 302 corresponding to the certain RGB value 301 is greater, the color difference between the color to be printed in a case that an image represented by the certain RGB value 301 is printed by the forwarding route printing and the color to be printed in a case that the image represented by the certain RGB value 301 is printed by the returning route printing is greater.

For example, the evaluation table VT is prepared by the manufacturer of the printer 200 by experimentally and previously determine the weight 302 corresponding to the RGB value of each of the grids. For example, a uniform image expressed by the RGB value of each of the respective grids GD is subjected to the forwarding route printing to thereby prepare a first patch, and the same image is subjected to the returning route printing to thereby prepare a second patch. Each of the first and second patches is an area of the uniform color represented by one pixel value. Further, a weight 302 corresponding to the color difference between the first and second patches is determined. For example, the weight 302 is determined to be a greater value as the magnitude of a color difference (a distance in the CIELab color space) specified by the measured color values (for example, the color values of the L*a*b* color space), respectively, of the two patches (first and second patches) is greater.

For example, white (255, 255, 255) is not a color expressed by a dot (rather, the white is expressed by a ground (background) color of the sheet M), and thus the weight 302 made to correspond to a white grid GD is zero. Further, in a color which is expressed by one kind of dot such as each of the primary colors of C, M, Y and K, any overlap of the dots of the plurality of colors as described above is not generated, and thus the weight 302 made to corresponds to the grid GD of each of the primary colors is zero. Furthermore, in a color which is expressed by the dots of the plurality of colors, the overlap of the dots of the plurality of colors is generated, and thus the weight 302 made to correspond to the grid GD of these colors may take a value greater than 0 zero.

A-4: Printing Processing

Figure 6:
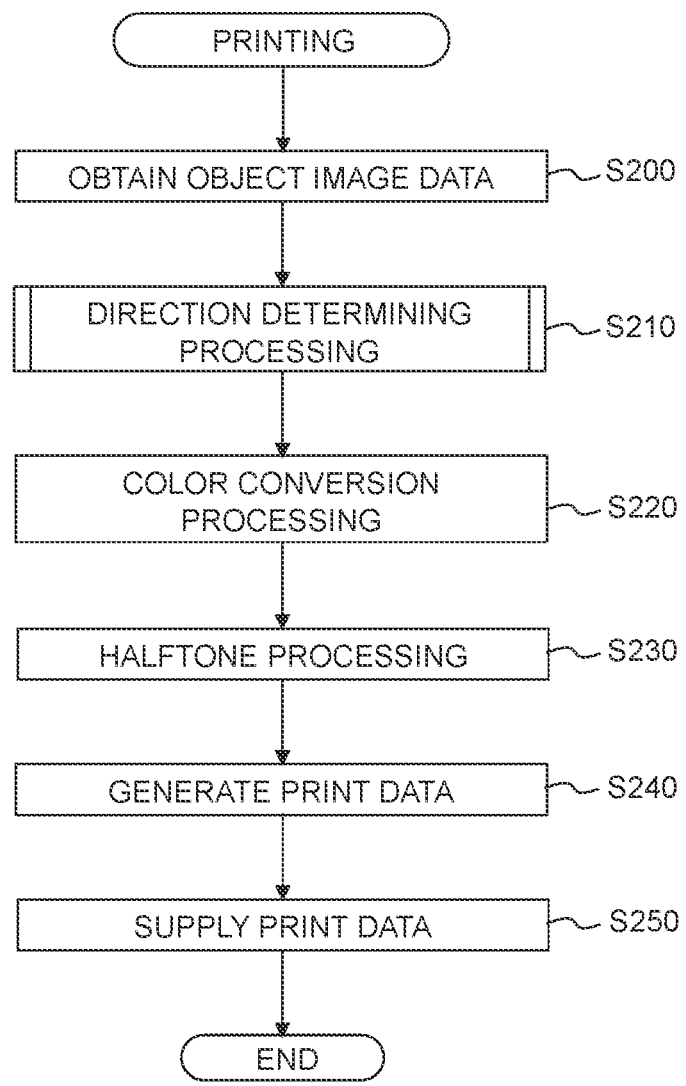
FIG. 6 is a flow chart of a printing processing.

The CPU 210 (FIG. 1) of the printer 200 executes a printing processing based on a printing instruction from a user. The printing instruction includes designation of image data which indicates an image to be printed. FIG. 6 is a flow chart of the printing processing.

In step S200, the CPU 210 obtains image data indicated by the printing instruction from the volatile memory 220, as object image data (target image data). The object image data of the present embodiment is RGB image data. The RGB image data is bitmap data in which a RGB value is included for each of pixels. Note that in a case that the obtained image data is of a format different from the RGB image data, the CPU 210 converts the obtained image data to RGB image data. For example, in a case that the image data is image data described in a page-description language, image data of EMF (Enhanced Meta File) format, the CPU 210 executes a rasterization processing so as to covert the image data to RGB image data.

In step S210, the CPU 210 executes a direction determining processing. The direction determining processing is a processing of determining a print direction of each of a plurality of pieces of the partial printing for printing an object image indicated by the object image data to be either one of the forwarding route direction D1 and the returning route direction D2. The details of this processing will be described later on.

In step S220, the CPU 210 executes a color conversion processing with respect to the object image data. The color conversion processing is a processing of converting the RGB values of a plurality of pixels of the object image to CMYK values, respectively. The CMYK values are color values of the CMYK color system including component values corresponding to the ink(s) which is (are) to be used in the printing (in the present embodiment, the component values of C, M, Y and K). The color conversion processing is executed, for example, by referring to a publicly known look-up table defining the corresponding relationship between the RGB values and the CYMK values.

In step S230, the CPU 210 executes a halftone processing with respect to the object image data, for which the color conversion processing has been executed, so as to generate dot data. The dot data is data indicating a dot formation state for each of the pixels, with respect to each of the respective color components of CMYK. The value of each of the pixels in the dot data indicates, for example, a dot formation state of two gradations which are "no dot" and "with dot", or a dot formation state of four gradations which are "no dot", "small dot", "medium dot", and "large dot". The halftone processing is executed by using a publicly known method such as the dithering method, the error diffusion method, etc.

In step S240, the CPU 210 generates print data by using the generated dot data. The print data includes a plurality of pieces of partial print data for performing a plurality of times of the partial printing. Each of the plurality of pieces of partial print data includes information indicating the print direction of one of the plurality of times of the partial printing (the forwarding route direction D1 or the returning route direction D2), dot data corresponding to one of the plurality of time of the partial printing, and information indicating the conveyance amount of the sheet conveyance after one of the plurality of time of the partial printing.

In step S250, the CPU 210 supplies the generated print data to the printing mechanism 100. The printing mechanism 100 executes the plurality of times of the partial printing and a plurality of time of the sheet conveyance in accordance with the print data. With this, the print image PI (FIG. 3) is printed on the sheet M.

A-5: Direction Determining Processing

Figure 7:
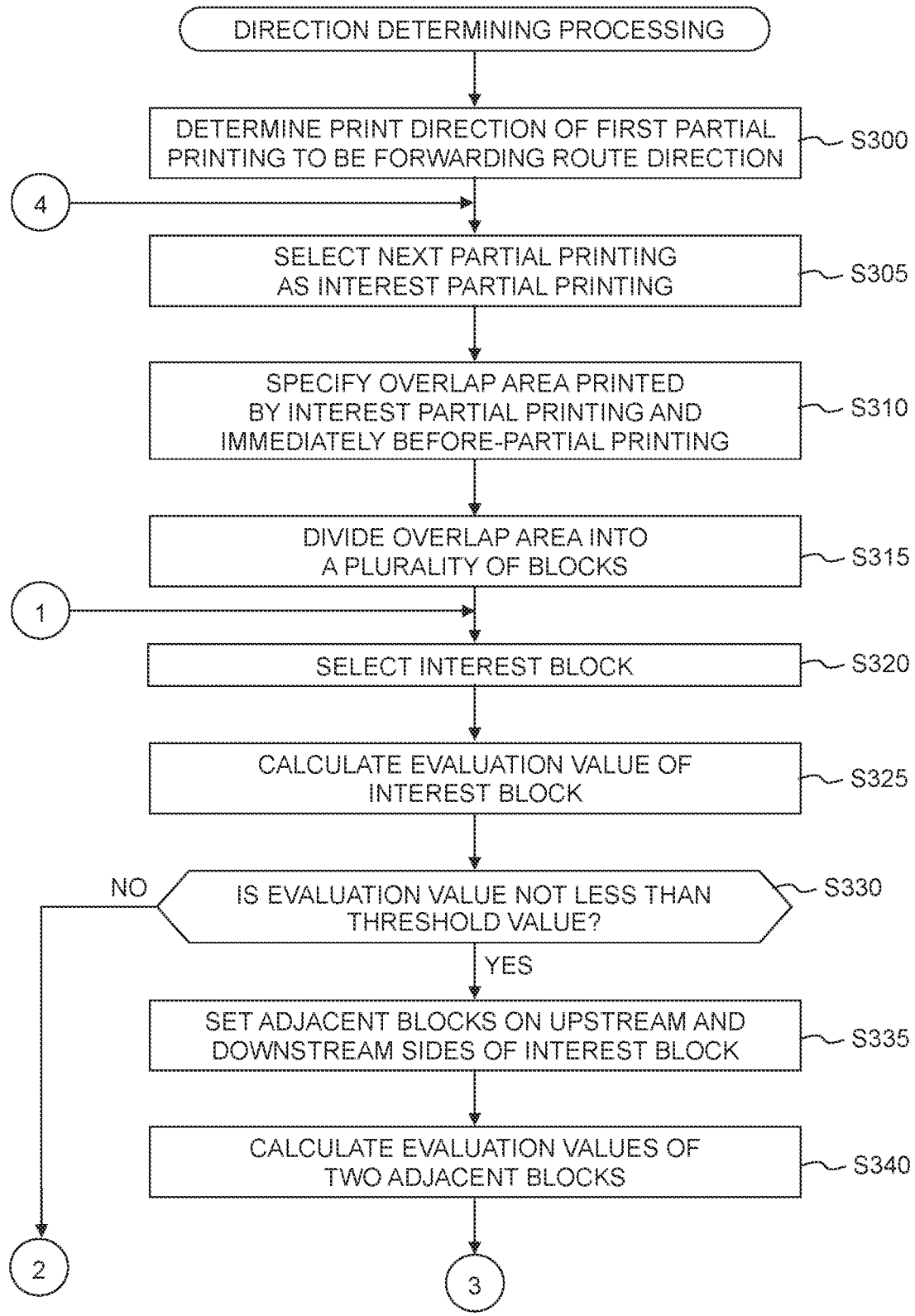
FIG. 7 is a flow chart of a direction determining processing.
Figure 8:
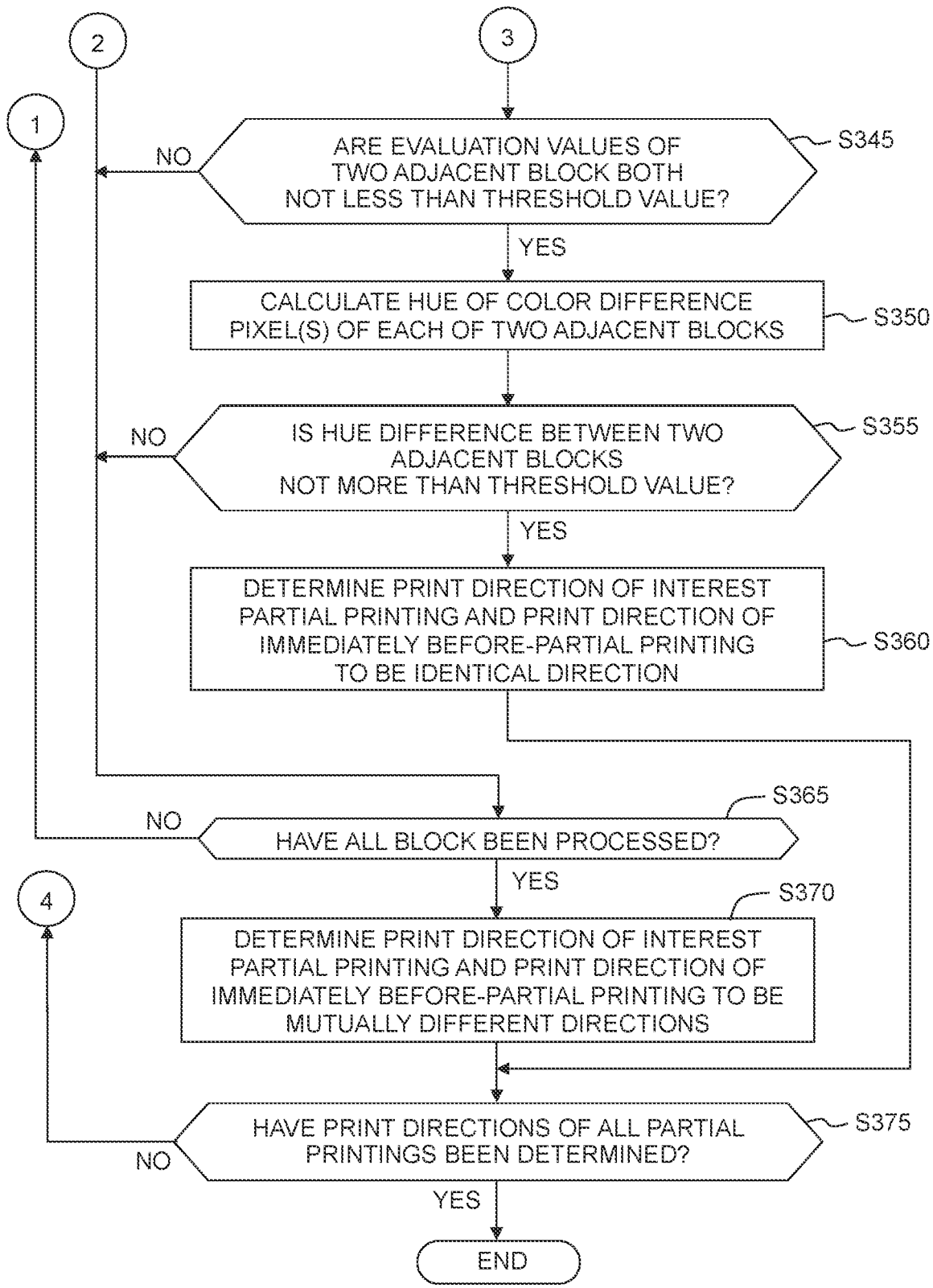
FIG. 8 is a flow chart of the direction determining processing.

FIGS. 7 and 8 are each a flow chart of the direction determining processing. In step S300 of FIG. 7, the CPU 210 determines the print direction of a first partial printing to be the forwarding route direction D1. In step S305, the CPU 210 selects a next partial printing (which is to be performed after the first partial printing) as an interest partial printing.

In step S310, the CPU 210 specifies, as an interest overlap area, an overlap area which is to be printed by the interest partial printing and a partial printing immediately before the interest partial printing (hereinafter referred to as "immediately before-partial printing") in an RGB image RI indicated by the object image data (RGB image data).

The RGB image RI indicated by the RGB image data corresponds to the print image PI of FIG. 3. Accordingly, FIG. 3 can be also referred to as a view depicting the RGB image RI. The RGB image RI includes a plurality of raster lines RL (for example, a raster line RL1 of FIG. 3) which extend in the X direction (the direction corresponding to the print directions D1 and D2), and of which positions in the Y direction are mutually different. Each of the plurality of raster lines RL is a line extending in the print direction of FIG. 3, and is constructed of a plurality of pixels. Each of the plurality of raster lines RL in the print image PI in which the dots are formed and each of the plurality of raster lines RL in the RGB image RI which is constructed of the pixels correspond to each other on the one-to-one basis, as described above. Accordingly, in the present specification and the drawings, the raster lines of the print image PI and the raster lines of the RGB image RI are denoted by same reference numerals. Further, in the RGB image RI, areas corresponding, respectively, to the overlap areas SA, the ordinary areas NA and the partial areas PA of the print image PI as described above are referred to as overlap areas SA, ordinary areas NA and partial areas PA of the RGB image RI. In the RGB image RI, a direction corresponding to the conveying direction AR of the print image PI is referred to as a conveying direction AR in the RGB image RI.

For example, in a case that the interest partial printing is a second partial printing, the immediately before-partial printing is the first partial printing. In this case, the overlap area SA1 of FIG. 3 is specified as the interest overlap area. In a case that the interest partial printing is the third partial printing, the immediately before-partial printing is the second partial printing. In this case, the overlap area SA2 of FIG. 3 is specified as the interest overlap area.

In step S315, the CPU 210 divides the interest overlap area into a plurality of blocks BL. Specifically, the interest overlap area is divided into a plurality of rectangular blocks BL arranged side by side in the print direction (X direction in FIG. 3). A length in the conveying direction AR (Y direction of FIG. 3) of each of the plurality of rectangular blocks BL is the overlap area length Ha. The overlap area length Ha is a predetermined length, for example, a length corresponding to the pixels of which number (quantity) is in a range of several tens to several hundreds.

In step S320, the CPU 210 selects one interest block among the plurality of blocks BL in the interest overlap area. For example, a plurality of pieces of the block BL, in the interest overlap area, are selected as interest block, one by one, sequentially from the upstream side in the X direction.

In step S325, the CPU 210 calculates an evaluation value EV of the interest block. For example, the CPU 210 specifies a weight 302 (FIG. 5) corresponding to each pixel within the interest block, while referring to the evaluation table VT (FIG. 5). For example, a weight 302 made to correspond to a grid GD closest to a RGB value of a specified pixel is specified as the weight 302 corresponding to the specified pixel. Instead of doing so, it is allowable to use an interpolation calculation using the weight 302 made to correspond to a plurality of grids GD close to the RGB value of the specified pixel to thereby specify the weight 302 corresponding to the specified pixel. The CPU 210 calculates an average value of the weights 302 of the plurality of pixels inside the interest block, as the evaluation value EV of the interest block.

In step S330, the CPU 210 determines as to whether or not the evaluation value EV of the interest block is not less than a threshold value THv. For example, the threshold value THv is experimentally determined so that the evaluation value EV becomes to be not less than the threshold value THv in a case that the greater part (for example, not less than 70%) of the plurality of pixels within the interest block is color different pixels. Each of the color difference pixels is a pixel in which the above-described color difference between the forwarding route printing and the returning route printing is relatively great. In other words, the color difference pixel is a pixel in which the difference between the color which is printed in a case that the printing is performed by the forwarding route printing and the color which is printed in a case that the printing is performed by the returning route printing is great, as compared with another pixel which is different from the color difference pixel.

For example, in the example of FIG. 3, it is assumed that a hatched part of an object OBa and a hatched part of an object OBb are constructed of the color difference pixels. In a case that the interest block is a block BLa or a bloc BLb, since the entirety of each of the blocks BLa and BLb is constructed of the color difference pixels, the evaluation value EV is determined to be not less than the threshold value THv.

In the example of FIG. 3, it is assumed that a hatched part of an object OBc and a hatched part of an object OBd are constructed of the color difference pixels. A gap (space) sp is present between the objects OBc and OBd, and the space sp is positioned in the block BLc, and thus it cannot be said that the greater part of the block BLc is constructed of the color difference pixels. Accordingly, in a case that the interest block is the block BLc, the evaluation value EV is determined to be less than the threshold value THv. Further, in the example of FIG. 3, any object is not present in the block BLd, and the color of a plurality of pixels within the block BLd is white. Accordingly, in a case that the interest block is the block BLd, the evaluation value EV is determined to be less than the threshold value THv. Furthermore, even if an object is present in the entirety of the interest block, in a case that the color of the pixels of the object is different from that of the color difference pixel, the evaluation value EV is determined to be less than the threshold value THv (not depicted in the drawings). In the following, a block of which evaluation value EV is not less than the threshold value THv is also referred as a "color difference block".

In a case that the evaluation value EV of the interest block is not less than the threshold value THv (step S330: YES), then in step S335, the CPU 210 sets adjacent blocks UB, DB respectively on the upstream side and the downstream side of the interest block. For example, in the example of FIG. 3, in a case that the interest block is the block BLa, an upstream side-adjacent block UBa and a downstream side-adjacent block DBa are set. In a case that the interest block is the block BLb, an upstream side-adjacent block UBb and a downstream side-adjacent block DBb are set.

The upstream side-adjacent block UBa is a block defined on the upstream side of the interest block to adjacent the interest block, and the downstream side-adjacent block DBa is a block defined on the downstream side of the interest block to adjacent the interest block. In other words, the upstream side-adjacent block UBa is a partial block of the ordinary area NA4 and is a block set along a boundary between the ordinary area NA4 and the overlap area SA3. Further, the downstream side-adjacent block DBa is a partial block of the ordinary area NA3, and is a block set along a boundary between the ordinary area NA3 and the overlap area SA3. In the present embodiment, the size of the upstream side-adjacent block UBa and the size of the downstream side-adjacent block DBa (each of which is a number (quantity) of the pixels in the print direction and a number (quantity) of the pixels in the conveying direction) are same as the size of the interest block. The size of the upstream side-adjacent block UBa and the size of the downstream side-adjacent block DBa may be a size which is different from the size of the interest block.

In step S340, the CPU 210 calculates the evaluation value EV of each of the two adjacent blocks, namely, the evaluation value EV of each of the upstream side-adjacent block UB and the downstream side-adjacent block DB. The method of calculating the evaluation value EV is same as the method described above regarding the interest block.

In step S345, the CPU 210 determines as to whether or not the evaluation values EV of the two adjacent blocks are both not less than the threshold value THv. In the example of FIG. 3, in a case that the interest block is the block BLa, the color difference pixels are present in the entirety of both of the upstream side-adjacent block UBa and the downstream side-adjacent block DBa which are adjacent to the block BLa, and thus the evaluation values EV of the two adjacent blocks are both determined to be not less than the threshold value THv. In a case that the interest block is the block BLb, since the color difference pixels are present in the entirety of both of the upstream side-adjacent block UBb and the downstream side-adjacent block DBb which are adjacent to the block BLb, the evaluation values EV of the two adjacent blocks are both determined to be not less than the threshold value THv.

In a case that the evaluation values EV of the two adjacent blocks are both not less than the threshold value THv (step S345: YES), then in step S350, the CPU 210 calculates the hue of the color difference pixel(s) of each of the two adjacent blocks. For example, in the present embodiment, it is understood that the greater part of each of the two adjacent blocks are the color difference pixels, since the evaluation value EV of each of the two adjacent blocks is not less than the threshold value THv. Accordingly, in the present embodiment, the average value of the hue of a plurality of pixels of the downstream side-adjacent block DB is calculated as a hue Hd of the color difference pixels of the downstream side-adjacent block DB. The average value of the hue of a plurality of pixels of the upstream side-adjacent block UB is calculated as a hue Hu of the color difference pixels of the upstream side-adjacent block UB. For example, the CPU 210 converts the RGB values of the respective pixels within the upstream and downstream adjacent blocks to color values of a HSV color system (also referred to as "HSV value(s)"). The HSV value includes three component values, namely, an H value indicating the hue, an S value indicating the saturation (chroma), and a V value indicating a value (brightness). The CPU 210 calculates the average value of the H values indicating the hue to thereby calculate the hues Hu and Hd described above.

In step S355, the CPU 210 determines as to whether or not hue difference ΔH between the two adjacent blocks is not more than a threshold value THh. For example, the CPU 210 calculates the absolute value of a difference (Hu-Hd) between the hue Hu of the color difference pixels of the upstream side-adjacent block UB and the hue Hd of the color difference pixels of the downstream side-adjacent block DB as a hue difference ΔH, and the CPU 210 determines as to whether or not the hue difference ΔH is not more than the predetermined threshold value THh.

In the example of FIG. 3, it is assumed that the color of the color difference pixels in the upstream side-adjacent block UBa and the color difference pixels in the downstream side-adjacent block DBa are similar, and that the hue difference ΔH between the colors of the color difference pixels in the upstream side-adjacent block UBa and the color difference pixels in the downstream side-adjacent block DBa is determined to be not more than the threshold value THh. Further, it is also assumed that the color of the color difference pixels in the upstream side-adjacent block UBb and the color difference pixels in the downstream side-adjacent block DBb are not similar, and that the hue difference ΔH between the colors of the color difference pixels in the upstream side-adjacent block UBb and the color difference pixels in the downstream side-adjacent block DBb is determined to be greater than the threshold value THh.

In a case that the hue difference ΔH between the two adjacent blocks is not more than the threshold value THh (step S355: YES), then in step S360, the CPU 210 determines the print direction of the interest partial printing to be a direction same as the print direction of the immediately before-partial printing. In the example of FIG. 3, in a case that the interest block is the block BLa, the hue difference ΔH between the two adjacent blocks UBa and DBa is not more than the threshold value THh. Accordingly, the interest partial printing, namely, the print direction of the fourth partial printing executed at the head position P4 is determined to be the direction same as the print direction of the third partial printing executed at the head position P3. As a result, as indicated in FIG. 3, the print direction of the fourth partial printing becomes to be the forwarding route direction D1, same as the print direction of the third partial printing.

In a case that the evaluation value EV of the interest block is less than the threshold value THv (step S330: NO), in a case that the evaluation value EV of at least one of the two adjacent block is less than the threshold value THv (step S345: NO) or in a case that the hue difference ΔH between the two adjacent blocks is greater than the threshold value THh (step S355: NO), the CPU 210 proceeds the processing to step S365.

In step S365, the CPU 210 determines as to whether or not all the blocks BL within the interest overlap area have been processed as the interest block. In a case that there is a block BL which has not been processed yet (step S365: NO), the CPU 210 returns to step S320, and selects the block BL which has not been processed as the interest block.

In a case that all the blocks BL within the interest overlap area have been processed as the interest block (step S365: YES), then in step S370, the CPU 210 determines the print direction of the interest partial printing to be a direction opposite to the print direction of the immediately before-partial printing.

In a case that the CPU 210 determines the print direction of the interest partial printing in step S360 or step 370, the CPU 210 proceeds the processing to step S375. In step S375, the CPU 210 determines as to whether or not the print directions of all the partial printings have been determined. In a case that there is a partial printing of which print direction has not been determined yet (step S375: NO), the CPU 210 returns to step S305, and selects a next partial printing as the interest partial printing. In a case that the print directions of all the partial printings have been determined (step S375: YES), the CPU 210 ends the direction determining processing.

As appreciated from the foregoing explanation, in a case that at least one of the plurality of pieces of the block BL within the interest overlap area which is printed by the interest partial printing and the immediately before-partial printing satisfies all the following conditions 1 to 4, the print direction of the interest partial printing is determined to be the same direction as the print direction of the immediately before-partial printing. In the following, the situation that at least one of the plurality of pieces of the block BL within the interest overlap area satisfies all the following conditions 1 to 4 is also referred to as "a same direction determining condition is satisfied".

Condition 1: The evaluation value EV of the block BL is not less than the threshold value THv.

Condition 2: The evaluation value EV of the upstream side-adjacent block UB which is defined adjacently on the upstream side of the block BL is not less than the threshold value THv.

Condition 3: The evaluation value EV of the downstream side-adjacent block DB which is defined adjacently on the downstream side of the block BL is not less than the threshold value THv.

Condition 4: The hue difference ΔH between the upstream side-adjacent block UB and the downstream side-adjacent block DB is not more than the threshold value THh.

In a case that the same direction determining condition is not satisfied, namely, in a case that all of the plurality of blocks BL within the interest overlap area do not satisfy at least one of the above-described conditions 1 to 4, the print direction of the interest partial printing is determined to be the direction different from the print direction of the immediately before-partial printing. The condition 1 is an example of a "second condition" of an aspect of the present disclosure. The conditions 1 to 3 are an example of a "first condition" of an aspect of the present disclosure. The condition 4 is an example of a "third condition" of an aspect of the present disclosure.

The same direction determining condition will be explained further. FIGS. 9A to 9F is a view explaining the determination of the print direction. Each of FIGS. 9A to 9F schematically depicts a pattern in each of which one or two of color difference objects OB1 to OB8 constructed of a plurality of pieces of mutually same or mutually similar color difference pixels are present in an interest overlap area SAt, an ordinary area NAt (upstream-side ordinary area NAt) on the upstream side of the interest overlap area SAt, and an ordinary area NAp (downstream-side ordinary area NAp) on the downstream side of the interest overlap area SAt.

Figure 9A:
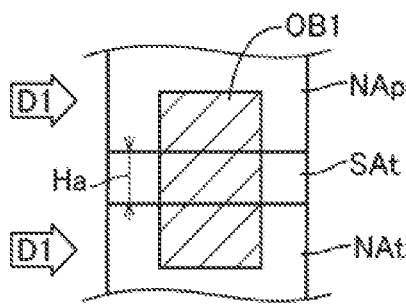
FIGS. 9A, 9B, 9C, 9D, 9E and 9F are each a view explaining the determination of a print direction.

In the pattern of FIG. 9A, the color difference object OB1 is present straddling the interest overlap area SAt, the upstream side-ordinary area NAt and the downstream side-ordinary area NAp. In this case, if the print direction of the interest partial printing by which the interest overlap area SAt and the upstream side-ordinary area NAt are to be printed and the print direction of the immediately before-partial printing by which the interest overlap area SAt and the downstream side-ordinary area NAp are to be printed are mutually different directions (directions which are opposite to each other), the color difference is more likely to be conspicuous. This is because, in a case that same or similar continuous colors are printed, respectively, to be different colors due to the color difference between the forwarding route printing and the returning route printing, the difference between the color printed in the upstream side-ordinary area NAt and the color printed in the downstream side-ordinary area NAp is particularly likely to be conspicuous. Accordingly, in this case, it is desired that the print direction of the interest partial printing and the print direction of the immediately before-partial printing are determined to be the same direction.

Figure 9B:
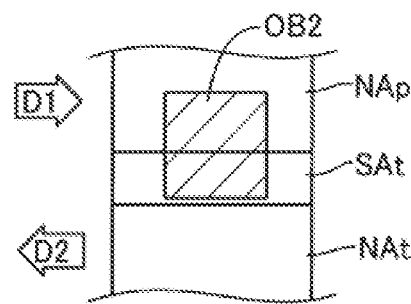

In the pattern of FIG. 9B, the color difference object OB2 is present straddling the interest overlap area SAt and the downstream side-ordinary area NAp, whereas the color difference object OB2 is not present in the upstream side-ordinary area NAt. In this case, even if the print direction of the interest partial printing and the print direction of the immediately before-partial printing are the mutually different directions, the color difference is less likely to be conspicuous, as compared with the pattern of FIG. 9A. Accordingly, in the present embodiment, it is desired that the print direction of the interest partial printing and the print direction of the immediately before-partial printing are determined to be the mutually different directions.

Figure 9C:
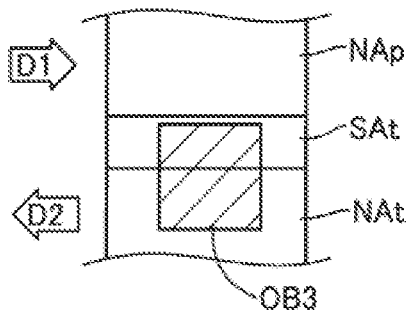

In the pattern of FIG. 9C, the color difference object OB3 is present straddling the interest overlap area SAt and the upstream side-ordinary area NAt, whereas the color difference object OB3 is not present in the downstream side-ordinary area NAp. In this case, similarly to the pattern of FIG. 9B, it is desired that the print direction of the interest partial printing and the print direction of the immediately before-partial printing are determined to be the mutually different directions.

Figure 9D:
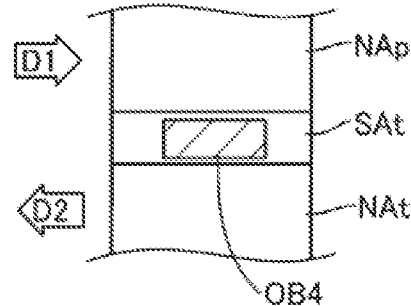

In the pattern of FIG. 9D, the color difference object OB4 is present in the interest overlap area SAt, whereas the color difference object OB4 is not present in the upstream side-ordinary area NAt and the downstream side-ordinary area NAp. In this case, it is considered that, even if the interest overlap area SAt is printed by the forwarding route printing and the returning route printing, the color of the object OB4 becomes to be a color which is intermediate between the color printed by the forwarding route printing and the color printed by the returning route printing. Accordingly, in this case, since the color difference between the forwarding route printing and the returning route printing is not conspicuous, it is desired that the print direction of the interest partial printing and the print direction of the immediately before-partial printing are determined to be the mutually different directions.

Figure 9E:
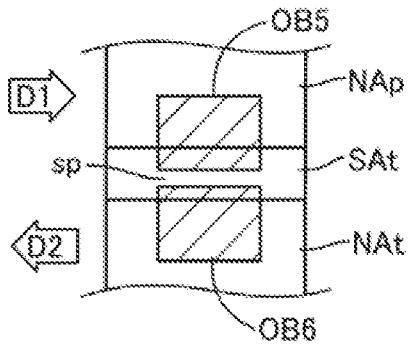

In the pattern of FIG. 9E, the color difference object OB6 is present straddling the interest overlap area SAt and the upstream side-ordinary area NAt. Further, the color difference object OB5 having a same or similar hue as that of the color difference object OB6 is present straddling the interest overlap area SAt and the downstream side-ordinary area NAp. A space sp is present between the color difference object OB5 and the color difference object OB6, and the color difference object OB5 and the color difference object OB6 are not connected or linked. In a case that the color difference object OB5 and the color difference object OB6 are not connected, even if there is any color difference due to color difference between the forwarding route printing and the returning route printing is present between the color difference object OB5 and the color difference object OB6, the color difference between the forwarding route printing and the returning route printing is less likely to be conspicuous, as compared with a case in which the color difference object OB5 and the color difference object OB6 are connected or continuous. In this case, it is desired that the print direction of the interest partial printing and the print direction of the immediately before-partial printing are determined to be the mutually different directions.

Figure 9F:
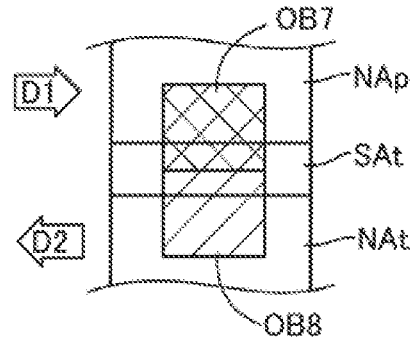

In the pattern of FIG. 9F, the color difference object OB8 is present straddling the interest overlap area SAt and the upstream side-ordinary area NAt. Further, the color difference object OB7 having a different hue as that of the color difference object OB8 is present straddling the interest overlap area SAt and the downstream side-ordinary area NAp. The color difference object OB7 and the color difference object OB8 are connected. Even if the color difference object OB7 and the color difference object OB8 are connected, in a case that the hue of the color difference object OB7 and the hue of the color difference object OB8 are different, the color difference due to color difference between the forwarding route printing and the returning route printing is not conspicuous between the color difference object OB7 and the color different object OB8. In this case, it is desired that the print direction of the interest partial printing and the print direction of the immediately before-partial printing are determined to be the mutually different directions.

The same direction determining condition including the above-described conditions 1 to 4 is determined so that the print direction can be appropriately determined with respect to each of the above-described patterns. In the case of the pattern of FIG. 9A, for example, since the evaluation value EV of the block BL in which the color difference object OB1 is present becomes to be not less than the threshold value TEN the condition 1 is satisfied. Further, the color difference object OB1 is also present in the downstream side-adjacent block DB and the upstream side-adjacent block UB which are adjacent to the block BL satisfying the condition 1. Accordingly, since the evaluation value EV of each of these adjacent blocks DB and UB also becomes to be not less than the threshold value TEN the conditions 2 and 3 are satisfied. Furthermore, the color of the downstream side-adjacent block DB and the color of the upstream side-adjacent block UB are same or similar. Accordingly, since the hue difference ΔH between these adjacent blocks DB and UB are not more than the threshold value THh, the condition 4 is satisfied. Accordingly, in the pattern of FIG. 9A, the print direction of the interest partial printing and the print direction of the immediately before-partial printing are appropriately determined to be the same direction.

In such a manner, in a case that the conditions 1 to 3 are satisfied, there is a high possibility that the color difference pixels are present straddling the boundary between the interest overlap area SAt and the downstream side-adjacent ordinary area NAp and that the color difference pixels are present straddling the boundary between the interest overlap area SAt and the upstream side-adjacent ordinary area NAt. In other words, there is a high possibility that the color difference pixels are present in both of the interest overlap area SAt and the downstream side-adjacent ordinary area NAp and that the color difference pixels are present in both of the interest overlap area SAt and the upstream side-adjacent ordinary area NAt.

In the case of the pattern 9B, the color difference object OB2 is not present in the upstream side-adjacent block UB which is adjacent to the block BL in which the color difference object OB2 is present. Accordingly, at least the condition 2 is not satisfied in the case of the pattern of FIG. 9B.

In the case of the pattern 9C, the color difference object OB3 is not present in the downstream side-adjacent block DB which is adjacent to the block BL in which the color difference object OB3 is present. Accordingly, at least the condition 3 is not satisfied in the case of the pattern of FIG. 9C.

In the case of the pattern 9D, the color difference object OB4 is not present in the two adjacent blocks DB and UB which are adjacent to the block BL in which the color difference object OB4 is present. Accordingly, at least the conditions 2 and 3 are not satisfied in the case of the pattern of FIG. 9D.

In the case of the pattern 9E, since the space sp is present between the color difference object OB5 and the color difference object OB6, a block BL of which greater part is constructed of the color difference pixels is not present in the overlap area SA. Accordingly, at least the condition 1 is not satisfied in the case of the pattern of FIG. 9E.

In the case of the pattern of FIG. 9F, only the color difference object OB7 is present in the downstream side-adjacent block DB which is adjacent to the block BL in which the color difference object OB7 and the color different object OB8 are present, and only the color difference object OB8 is present in the upstream side-adjacent block UB which is adjacent to the block BL. Further, since the hue of the color of the color difference object OB7 and the hue of the color of the color difference object OB8 are different, the hue difference ΔH between the downstream side-adjacent block DB and the upstream side-adjacent block UB becomes to be not less than the threshold value THh. Accordingly, at least the condition 4 is not satisfied in the case of the pattern of FIG. 9F.

As described above, in each of the cases of FIGS. 9B to 9F, at least one of the conditions 1 to 4 is not satisfied. Accordingly, in each of the cases of FIGS. 9B to 9F, the print direction of the interest partial printing and the print direction of the immediately before-partial printing are appropriately determined to be the mutually different directions.

According to the present embodiment as explained above, the CPU 210 is configured to execute: an image obtaining processing of obtaining the object image data (step S200 of FIG. 6); the direction determining processing of determining the print direction of each of the plurality of partial printings to be either one of the forwarding route direction D1 and the returning route direction D2 which are along the direction of the movement of the head, by using the object image data (step S210 of FIG. 6); and a print controlling processing of causing the printing mechanism 100 to execute the plurality of partial printings by using the object image data to thereby cause the printing mechanism 100 to print the object image (print image PI) (steps S220 to S250 of FIG. 6). The head movement of each of the plurality of partial printings is executed by the direction determined by the direction determining processing (FIG. 3, etc.). The print image PI includes: a first partial image (for example, an image within the downstream side-ordinary area NAp) which is printed by the first partial printing (for example, the partial printing by which the interest overlap area SAt and the downstream side-ordinary area NAp of FIGS. 9A to 9F are printed); a second partial image (for example, an image within the upstream side-ordinary area NAt) which is printed by the second partial printing (for example, the partial printing by which the interest overlap area SAt and the upstream side-ordinary area NAt of FIGS. 9A to 9F are printed); and an intermediate image (for example, an image within the interest overlap area SAt of FIGS. 9A to 9F) which is positioned between the first partial image and the second partial image and which is printed by both of the first partial printing and the second partial printing. The direction determining processing includes: a processing of determining whether or not the same direction determining condition is satisfied (steps S320 to S355 of FIG. 8), a processing of determining the print direction of the first partial printing and the print direction of the second partial printing to be the same direction in a case that the same direction determining condition is satisfied (step S360 of FIG. 8), and of determining the print direction of the first partial printing and the print direction of the second partial printing to be the mutually different directions in a case that the same direction determining condition is not satisfied (step S370 of FIG. 8). The same direction determining condition includes at least the condition indicating that the color difference pixels are present straddling the boundary between the first partial image and the intermediate image (namely, the color difference pixels are present in both of the first partial image and the intermediate image) and that the color difference pixels are present straddling the boundary between the second partial image and the intermediate image (namely, the color difference pixels are present in both of the second partial image and the intermediate image) (the conditions 1 to 3 as described above; see FIGS. 9A to 9F). As a result, in the printing having an image printed by both of a first partial printing and a second partial printing, between an image printed by the first partial printing and an image printed by the second partial printing, it is possible to suppress the occurrence such a situation that the color difference becomes to be conspicuous. Further, it is possible to suppress any lowering in the printing speed in the printing having an image printed by both of the first partial printing and the second partial printing, between an image printed by the first partial printing and an image printed by the second partial printing.

In an aspect of the present invention, the phrase that "the color difference pixels are present in both of the first (second) partial image and the intermediate image" may mean that the color difference pixels are present in both of a certain block which is set in the intermediate image in the direction determining processing and another block which is set in the first (second) partial image in the direction determining processing and which is adjacent to the certain block. Alternatively, in an aspect of the present invention, the phrase that "the color difference pixels are present in both of the first (second) partial image and the intermediate image" may mean that the color difference pixels are present in both of a part, of a certain single object included in the image data, positioned in the first (second) partial image and another part, of the certain single object, positioned in the intermediate image.

In a case that, as regarding the pattern of FIG. 9A, the color difference pixels are present straddling the boundary between the image of the interest overlap area SAt and the image of the downstream side-ordinary area NAp, and that the color difference pixels are present straddling the boundary between the image of the interest overlap area SAt and the image of the upstream side-ordinary area NAt, the color difference due to the color difference between the forwarding route printing and the returning route printing is conspicuous in some cases. On the other hand, in a case that the color difference due to the color difference between the forwarding route printing and the returning route printing is not conspicuous, it is desired to perform the printing bidirectionally from the viewpoint of the printing speed. According to the above-described embodiment, in a case that the color difference due to the color difference between the forwarding route printing and the returning route printing may be conspicuous, it is possible to determine the print direction of the first partial printing and the print direction of the second partial printing to be the same direction. On the other hand, in a case that the color difference due to the color difference between the forwarding route printing and the returning route printing is not conspicuous, it is possible to determine the print direction of the first partial printing and the print direction of the second partial printing to be the mutually opposite directions. Accordingly, it is possible to suppress the conspicuousness of the color difference due to the color difference between the forwarding route printing and the returning route printing and to suppress the lowering in the printing speed appropriately.

Note that as explained above with reference to FIG. 9E, in a case that the color difference object OB5 and the color difference object OB6 are not connected in the interest overlap area SAt, the situation in which the greater part of the interest overlap area SAt is occupied by the color difference pixels does not arise, and thus the condition 1 is not satisfied. Accordingly, the same direction determining condition can be expressed as condition indicating that an area constructed of the color difference pixels which are present straddling the boundary between the downstream side-ordinary area NAp and the interest overlap area SAt (for example, a color difference object) and an area constructed of the color difference pixels which are present straddling the boundary between the upstream side-ordinary area NAt and the interest overlap area SAt (for example, a color difference object) are connected. In the present embodiment, the same direction determining condition includes such a condition 1 as the necessary condition. By including such a condition, it is possible to determine, more strictly, as to whether or not the color difference is conspicuous. As a result, it is possible to suppress the conspicuousness of the color difference due to the color difference between the forwarding route printing and the returning route printing and to suppress the lowering in the printing speed, more appropriately. For example, it is possible to suppress the lowering in the printing speed caused by repeating the partial printings in the same direction, even though the color difference is not conspicuous.

Further, as explained above with reference to FIG. 9F, in a case that the hue difference ΔH between the hue of the color difference pixels which are present straddling the boundary between the downstream side-ordinary area NAp and the interest overlap area SAt (for example, the hue of the color difference object OB7) and the hue of the color difference pixels which are present straddling the boundary between the upstream side-ordinary area NAt and the interest overlap area SAt (for example, the hue of the color difference object OB8) is great, the color different due to the color difference between the forwarding route printing and the returning route printing is less likely to be conspicuous. In the present embodiment, the same direction determining condition includes the condition 4 indicating the hue difference ΔH is not more than the threshold value THh, as the necessary condition. By including such a condition, it is possible to determine, more strictly, as to whether or not the color difference is conspicuous. As a result, it is possible to suppress the conspicuousness of the color difference due to the color difference between the forwarding route printing and the returning route printing and to suppress the lowering in the printing speed, more appropriately. For example, it is possible to suppress the lowering in the printing speed caused by repeating the partial printings in the same direction, even though the color difference is not conspicuous.

Furthermore, in the present embodiment, whether or not the same direction determining condition is satisfied is determined by using the three determination areas (the interest block BL, the upstream side-adjacent block UB, the downstream side-adjacent block DB). Specifically, the same direction determining condition includes: the condition 3 indicating that the plurality of color difference pixels are present within the downstream side-adjacent block DB which is set inside the downstream side-ordinary area NAp; the condition 2 indicating that the plurality of color difference pixels are present within the upstream side-adjacent block UB which is set inside the upstream side-ordinary area NAt; and the condition 1 indicating that the plurality of color difference pixels are present within the interest overlap area SAt. In such a manner, since the determination is made as to whether or not the same direction determining condition is satisfied by using the three determination areas, it is possible to appropriately determine as to whether or not the color difference pixels are present straddling the boundary between the downstream side-ordinary area NAp and the interest overlap area SAt and whether or not the color difference pixels are present straddling the boundary between the upstream side-ordinary area NAt and the interest overlap area SAt.

Moreover, in the present embodiment, the downstream side-adjacent block DB which is included in the three determination areas is a partial area of the downstream side-ordinary area NAp, and is an area set along the boundary between the downstream side-ordinary area NAp and the interest overlap area SAt (FIG. 3). The upstream side-adjacent block UB which is included in the three determination areas is a partial area of the upstream side-ordinary area NAt, and is an area set along the boundary between the upstream side-ordinary area NAt and the interest overlap area SAt (FIG. 3). By setting the downstream side-adjacent block DB and the upstream side-adjacent block UB as the determination areas in such a manner, it is possible to determine, more appropriately, as to whether or not the color difference pixels are present straddling the boundary between the downstream side-ordinary area NAp and the interest overlap area SAt and as to whether or not the color difference pixels are present straddling the boundary between the upstream side-ordinary area NAt and the interest overlap area SAt.

Moreover, according to the present embodiment, as depicted in FIG. 4, the recording ratio of the overlap area SA changes depending on the position in the conveying direction AR. Specifically, the recording ratio by which the interest overlap area SAt is printed by the partial printing of printing the downstream side-ordinary area NAp becomes higher as approaching closer to the downstream side-ordinary area NAp, and the recording ratio by which the interest overlap area SAt is printed by the partial printing of printing the upstream side-ordinary area NAt becomes higher as approaching closer to the upstream side-ordinary area NAt. As a result, even in a case that the color difference between the forwarding route printing and the returning route printing is relatively great, the color changes in a stepped manner depending on the position in the conveying direction AR, in the interest overlap area SAt. Accordingly, it is possible to suppress any sudden change in the color depending on the position in the conveying direction AR, to thereby suppressing the occurrence of such a situation that the banding due to the color difference between the forwarding route printing and the returning route printing becomes to be conspicuous.

B: SECOND EMBODIMENT

In a second embodiment, the printer 200 is capable of executing the printing in two kinds of print mode which are a first print mode and a second print mode. In the first print mode, the overlap area length Ha which is the length in the conveying direction AR of the overlap area SA is set to be a first length Ha1. In the second print mode, the overlap area length Ha is set to be a second length Ha2 which is shorter than the first length Ha1.

As the overlap area length Ha is longer, the distance between the downstream side-ordinary area NAp and the upstream side-ordinary area NAt becomes greater. As the distance between the downstream side-ordinary area NAp and the upstream side-ordinary area NAt becomes greater, the difference between the color of the downstream side-ordinary area NAp and the color of the upstream side-ordinary area NAt becomes to be more difficult to be recognized. Accordingly, as the overlap area length Ha is longer, the color difference due to the color difference between the forwarding route printing and the returning route printing is less likely to be conspicuous, whereas as the overlap area length Ha is shorter, the color difference due to the color difference between the forwarding route printing and the returning route printing is more likely to be conspicuous. In view of this, in the second embodiment, the method of determining the print direction is changed between the first print mode and the second print mode.

Figure 10:
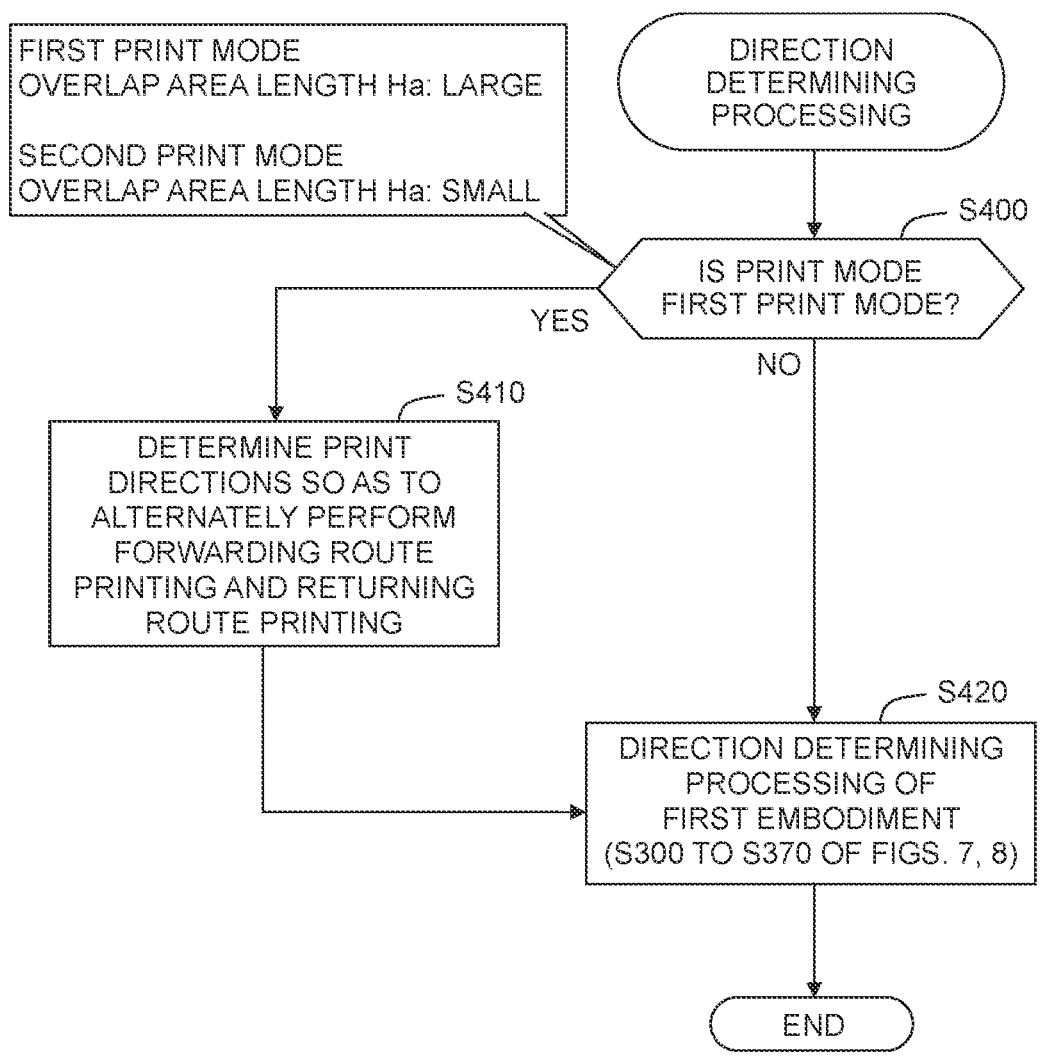
FIG. 10 is a flow chart of the printing direction determining processing.

FIG. 10 is a flow chart of the direction determining processing of the second embodiment. In step S400, the CPU 210 determines as to whether the print mode is the first print mode or the second print mode. The print mode is set, for example, by an instruction inputted by a user. Alternatively, the print mode may be set based on the kind (material, size, etc.,) of a recording medium.

In a case that the print mode is the first print mode (step S400: YES), then in step S410, the CPU 210 determines the print direction of each of a plurality of partial printings so that the forwarding route printing and the returning route printing are alternately performed, regardless of the contents of the object image (RGB image RI, print image PI).

In a case that the print mode is the second print mode (step S400: NO), then in step S420, the CPU 210 executes the direction determining processing of the first embodiment (steps S330 to S375 of FIGS. 7 and 8).

In the second embodiment, the configuration of a part thereof which is different from the direction determining processing is same as that of the first embodiment, and thus any explanation therefor will be omitted.

According to the second embodiment as explained above, in the second print mode, the print direction of one partial printing and the print direction of a next partial printing to be performed next to the one partial printing are more likely to be determined to be the same direction. As described above, as the length in the conveying direction AR of the overlap area SA is shorter, the color difference due to the color difference between the forwarding route printing and the returning route printing is more likely to be conspicuous. Thus, there is a high necessity to make the print direction of one partial direction and the print direction of the next partial printing to be the same direction. According to the second embodiment, the print direction of each of the partial printings can be determined appropriately, based on the overlap area length Ha. Accordingly, it is possible to realize both of the suppression of the conspicuousness of the color difference due to the color difference between the forwarding route printing and the returning route printing and the suppression of the lowering in the printing speed, more appropriately.

More specifically, in the second print mode of the second embodiment, the direction determining processing which is similar to or same as that of the first embodiment is executed (step S420 of FIG. 10); and in the first print mode of the second embodiment, unlike in the first embodiment, the print direction of one partial printing and the print direction of the next partial printing are always determined to be mutually different directions (mutually opposite directions), regardless of whether or not the object image satisfies the same direction determining condition (step S410 of FIG. 10). As a result, since it is possible to appropriately determine the print direction depending on the print mode, it is possible to realize both of the suppression of the conspicuousness of the color difference due to the color difference between the forwarding route printing and the returning route printing and the suppression of the lowering in the printing speed, more appropriately.

C: THIRD EMBODIMENT

Another example in which the determining method of the print direction is changed between the first print mode and the second print mode will be explained as a third embodiment.

Figure 11:
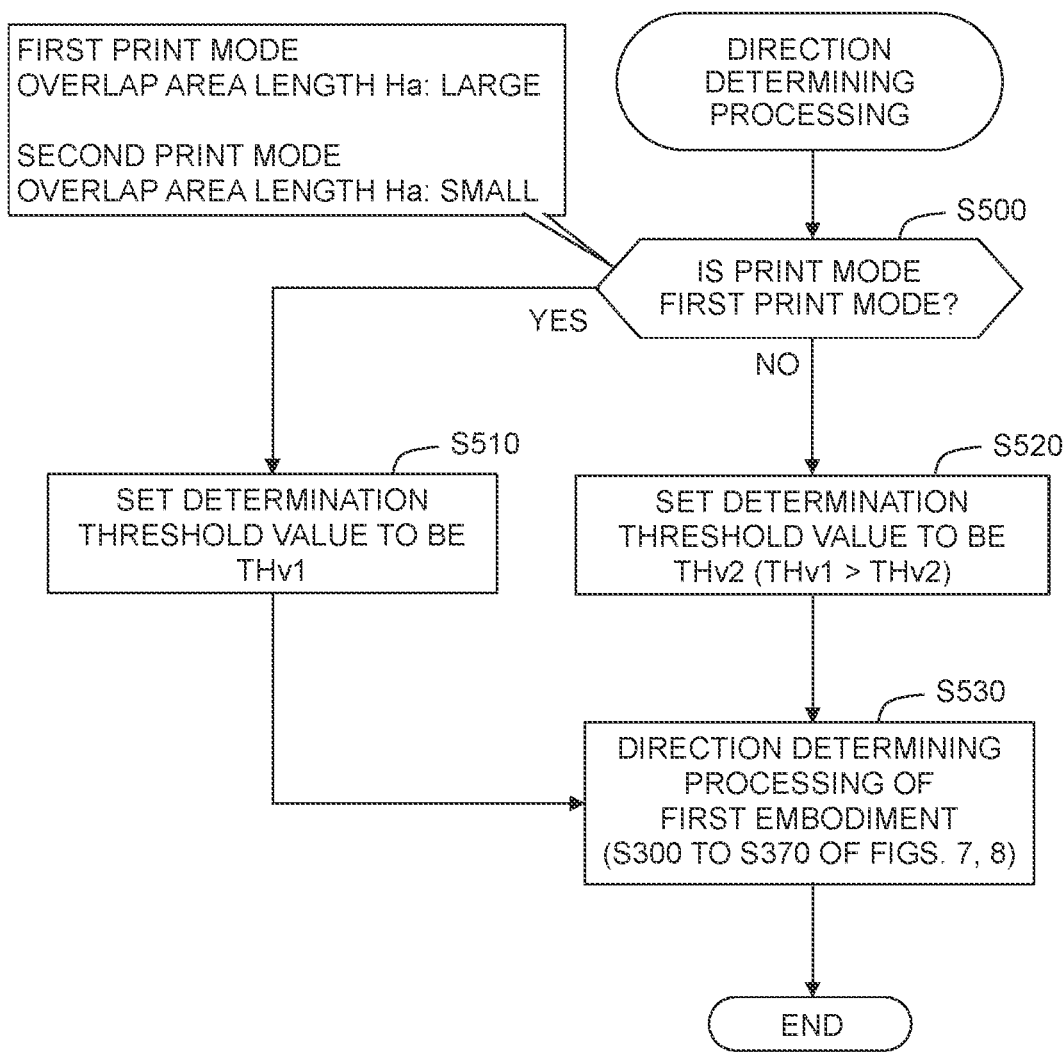
FIG. 11 is a flow chart of the printing direction determining processing.

FIG. 11 is the flow chart of the direction determining processing of the third embodiment. In step S500, the CPU 210 determines as to whether the print mode is the first print mode or the second print mode.

In a case that the print mode is the first print mode (step S500: YES), then in step S510, the CPU 210 sets the determination threshold value THv to be a first threshold value THv1. In a case that the print mode is the second print mode (step S500: NO), then in step S520, the CPU 210 sets the determination threshold value THv to be a second threshold value THv2 which is smaller than the first threshold value THv1.

In step S530, the CPU 210 executes the direction determining processing of the first embodiment (steps S330 to S375 of FIGS. 7 and 8). In this situation, regarding each of the threshold value THv used in step S300 of FIG. 7 and the threshold value THh used in step S355 of FIG. 8, different values are used depending on the print mode. Namely, regarding the threshold value used in step S300, in the first print mode, the first threshold value THv1 set in step S510 is used; and in the second print mode, the second threshold value THv2 set in step S520 is used.

In the third embodiment, the configuration of a part thereof which is different from the direction determining processing is same as that of the first embodiment, and thus any explanation therefor will be omitted.

According to the third embodiment as descried above, in the second print mode, the print direction of one partial printing and the print direction of a next partial printing to be performed next to the one partial printing are more likely to be determined to be the same direction, as compared with the first print mode. Accordingly, it is possible to realize both of the suppression of the conspicuousness of the color difference due to the color difference between the forwarding route printing and the returning route printing and the suppression of the lowering in the printing speed, more appropriately.

In the first print mode of the third embodiment, a first specified condition (specifically, a condition determined by using the first threshold value THv1) is used, as the same direction determining condition, so as to determine the print direction. In the second print mode, a second specified condition which is more easily satisfied than the first specified condition (specifically, a condition determined by using the second threshold value THv2) is used, as the same direction determining condition, so as to determine the print direction. As a result, in the second print mode, the print direction of one partial printing and the print direction of a next partial printing are more likely to be determined to be the same direction, as compared with the first print mode. Accordingly, it is possible to determine the print direction appropriately by using the different specified conditions depending on the print modes thereby making it possible to realize both of the suppression of the conspicuousness of the color difference due to the color difference between the forwarding route printing and the returning route printing and the suppression of the lowering in the printing speed, more appropriately.

More specifically, the first threshold value THv1 used in the first specified condition is the threshold value greater than the second threshold value THv2 used in the second specified condition. As the threshold value THv is greater, the evaluation value EV of the block as the object of the determination is allowed to be greater. Namely, even in a case that the evaluation value EV of the block is relatively large, the evaluation value EV is less likely to be determined to be not more than the threshold value TEN. The evaluation value EV is an index value which becomes greater as the number (quantity) of the color difference pixel present within the block is greater. Accordingly, in a case that the first threshold value THv1 is used, the number (quantity) of the color difference pixel, within the determination block, which is allowable so as to determine the print direction of the interest partial printing to be the opposite direction to the print direction of the immediately before-partial printing is greater as compared with the case of using the second threshold value THv2. In such a manner, by adjusting the threshold value THv used for the same direction determining condition depending on the print mode, it is possible to appropriately determine the same direction determining condition depending on the print mode. In such a manner, the first threshold value THv1 is adjusted such that the extent of allowing the color difference pixels to be present in at least one of the interest overlap area and the ordinary areas which are respectively on the upstream side and the downstream side of the interest overlap area to be greater, as compared with the second threshold value THv2.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

D: MODIFICATION (1) The same direction determining condition in the above-described embodiments is the condition constructed of the conditions 1 to 4 as described above. The present disclosure is not limited to or restricted by this; a variety of kinds of conditions may be used for the same direction determining condition. For example, the same direction determining condition may be satisfied when the following two conditions A and B are satisfied:

Condition A: A color difference pixel of which number (quantity) is not less than the predetermined number (quantity) is present in each of a raster line in the upstream end of the interest overlap area SAt and a raster line in the downstream end of the upstream side-ordinary area NAt.

Condition B: A color difference pixel of which number (quantity) is not less than a predetermined number (quantity) is present in each of a raster line in the downstream end of the interest overlap area SAt and a raster line in the upstream end of the downstream side-ordinary area NAp.

Determination as to whether or not a pixel is the color difference pixel is determined based on whether or not the weight 302 corresponding to the RGB value of the pixel is not less than a predetermined threshold value. The condition A and the condition B are another example of the "first condition" of an aspect of the present invention.

Further, in addition to the conditions A and B, it is allowable to include, as condition C, the presence of a plurality of color difference pixels which are continuous from the raster line on the upstream end of the interest overlap area SAt to the raster line on the downstream end of the interest overlap area SAt. The condition C is another example of the "second condition" of an aspect of the present invention.

(2) In the same direction determining condition of the first embodiment, the condition 4 may be omitted. Further, the condition 1 may be a condition that the number (quantity) of the color difference pixel included in the block BL is not less than a threshold value. Similarly, the conditions 2 and 3 may be a condition that the number (quantity) of the color difference pixel included in the upstream side-adjacent block BU and in the downstream side-adjacent block BD is not less than a threshold value, respectively. Furthermore, the condition 4 may be a condition that the hue difference between the hue of a color difference pixel positioned in the raster line in the upstream end of the interest overlap area SAt and the hue of a color difference pixel positioned in the raster line in the downstream end of the interest overlap area SAt is not more than a threshold value.

In the same direction determining condition of the first embodiment, it is allowable to omit the condition 1. Alternatively, it is allowable to include, in the same direction determining condition of the first embodiment, the condition C which is "the presence of a plurality of color difference pixels which are connected or continuous from a raster line on the upstream end of the interest overlap area SAt to a raster line on the downstream end of the interest overlap area SAt". In a case that the condition C is not satisfied even through the conditions 1 to 3 are satisfied, it is allowable to determine the printing direction of the interest partial printing and the printing direction of the immediately before-partial printing to be the mutually different directions.

(3) The weight 302 explained with reference to FIG. 5 is not limited to the magnitude of the difference between the measured color values, and the weight 302 may be a value indicating a magnitude of the difference between a variety of kinds of color values expressing the color to be printed. For example, a patch which is printed by a partial printing of the forwarding route direction D1 and a patch which is printed by a partial printing of the returning route direction D2 may be photographed by using a digital camera. Then, a value indicating the magnitude of the difference between the RGB values of the two patch images (for example, the Euclidian distance between the RGB values) obtained by the photographing may be adopted as the weight 302. Such a weight 302 may be same as the difference between the color values, and may be a value made to correspond to the difference of the color values in advance. In such a manner, the weight 302 may be a variety of kinds of values having correlation with the difference between the color values. In any of these cases, it is desired that the weight 302 is grater as the difference between the color values is greater.

(4) The configuration of the printing mechanism 100 may have other various configurations, instead of the above-described configuration. For example, in the printing mechanism 100 of the above-described embodiments, the conveyor 140 conveys the sheet M to thereby move the sheet M in the conveying direction AR relative to the printing head 110. Instead of this, it is also allowable to move the printing head 100 to a direction opposite to the conveying direction AR with respect to a sheet M which is fixed, thereby moving the sheet M in the conveying direction AR relative to the print head 110.

Further, the total number (quantity) of the ink (more generally, a coloring material) usable by the printing mechanism 100 may adopt an arbitrary number (quantity) which is not less than two. For example, it is also allowable that three kinds of inks (coloring materials) which are cyan C, magenta M and yellow Y.

(5) The format of the object image data may be other various kinds of format, instead of the bitmap format in the RGB color space. For example, it is allowable to use, for the printing processing, object image data of the bitmap format of a YCbCr color space. In such a manner, the pixel value to be used for the printing processing may be a pixel value which is represented by a variety of kinds of color space, such as the pixel value of YCbCr, instead of the RGB pixel values.

(6) As the printing medium, another medium different from the sheet M, such as, for example, a film for OHP, a CD-ROM, a DVD-ROM, etc., may be used, instead of the sheet M.

(7) In each of the above-described embodiments, the apparatus configured to execute the printing processing in FIG. 6 is the printer 200. Instead of this, a terminal device connectable to the printer 200, such as a personal computer, etc., may execute the printing processing of FIG. 6. In this case, a CPU of the terminal device executes a printer driver program to thereby execute the printing processing of FIG. 6.

Further, the apparatus configured to execute the printing processing in FIG. 6 may be a server which obtains image data from a printer and/or a terminal device and generates print data by using the obtained image data. Such a server may be a plurality of calculators which are capable of communicating with each other via a network.

(8) In each of the above-described embodiments, a part of the configuration realized by a hardware may be replaced by a software; on the contrary to this, a part or the entirety of the configuration realized by a software may be replaced with a hardware. For example, in a case that the printing processing of FIG. 6 is executed by the printer 200, the halftone processing and/or the color conversion processing may be realized, for example, by a dedicated hardware circuit (for example, an ASIC) which is operated by an instruction from the CPU 210 of the printer 200.

(9) In the third embodiment, regarding the threshold value THh used in step S355, the first threshold value THh1 may be used in the first print mode, and the second threshold value THh2 which is greater than the first threshold value THh1 may be used in the second print mode.

In the foregoing, although the present disclosure has been explained based on the embodiments and the modifications, the aspect (embodiment) of the present disclosure is provided for the purpose that the present invention can be easily understood, and is not intended to limit or restrict the present invention in any way. The present invention may be changed and/or improved without deviating from the gist and spirit of the present invention and the scope of the claims, and may encompasses any equivalent thereof

What is claimed is:

1. An image processing apparatus for a print executor having a head, the head including a first nozzle configured to discharge a first ink and a second nozzle configured to discharge a second ink, a kind of the first ink and a kind of the second ink being different from each other, a position of the first nozzle in a first direction and a position of the second nozzle in the first direction being different from each other, the print executor being configured to perform a printing by repeatedly executing a partial printing and a medium conveyance, the partial printing including forming a dot on a print medium by the head while performing a head movement of moving the head relative to the print medium in the first direction or in a second direction opposite to the first direction, the medium conveyance including conveying the print medium relative to the head in a medium conveyance direction crossing the first direction, the image processing apparatus comprising a controller configured to execute:

an image obtaining processing of obtaining an object image data indicating an object image;

a direction determining processing of determining, based on the object image data indicating the object image, a direction of the head movement in each of a plurality of times of the partial printing including a first partial printing and a second partial printing to be executed after the first partial printing to be the first direction or the second direction; and a print control processing of causing the print executor to print the object image by causing the print executor to execute the plurality of times of the partial printing based on the object image data, the direction of the head movement in each of the plurality of times of the partial printing being the direction determined by the direction determining processing, wherein;

the object image includes a first partial image to be printed by the first partial printing, a second partial image to be printed by the second partial printing, and an intermediate image positioned between the first partial image and the second partial image, the intermediate image being to be printed by both of the first partial printing and the second partial printing;

the direction determining processing including:

determining whether a specified condition including at least a first condition is satisfied, the first condition indicating that color difference pixels are present in both of the first partial image and the intermediate image, as well as the color difference pixels are present in both of the second partial image and the intermediate image;

determining the direction of the head movement in the first partial printing and the direction of the head movement in the second partial printing to be same as each other in a case that the specified condition is satisfied, and determining the direction of the head movement in the second partial printing to be opposite to the direction of the head movement in the first partial printing in a case that the specified condition is not satisfied, each of the color difference pixels is a pixel having larger difference between a color printed by the partial printing while moving the head in the first direction and a color printed by the partial printing while moving the head in the second direction, compared to pixel different from the color difference pixels.

2. The image processing apparatus according to claim 1, wherein the specified condition includes a second condition indicating that an area constructed by the color difference pixels being present in both of the first partial image and the intermediate image and an area constructed by the color difference pixels being present in both of the second partial image and the intermediate image are connected.

3. The image processing apparatus according to claim 1, wherein the specified condition includes a third condition indicating that a hue difference between a hue of the color difference pixels being present in both of the first partial image and the intermediate image and a hue of the color difference pixels being present in both of the second partial image and the intermediate image is not more than a reference.

4. The image processing apparatus according to claim 1, wherein the controller is configured to execute a first print mode of setting a length in the medium conveyance direction of the intermediate image to be a first length, and a second print mode of setting the length in the medium conveyance direction of the intermediate image to be a second length shorter than the first length, wherein the controller is further configured to:

determine whether the specified condition is satisfied or not by using a first threshold, in the first print mode; and determine whether the specified condition is satisfied or not by using a second threshold, in the second print mode, and wherein the second threshold is smaller than the first threshold.

5. The image processing apparatus according to claim 4, wherein the controller is configured to:

execute the direction determining processing in the second print mode; and execute a processing different from the direction determining processing in the first print mode, the processing including determining the direction of the head movement in the first partial printing and the direction of the head movement in the second partial printing to be different from each other, regardless of whether or not the specified condition is satisfied.

6. The image processing apparatus according to claim 1, wherein a recording ratio of the first partial printing for printing the intermediate image becomes higher as approaching closer to the first partial image; and a recording ratio of the second partial printing for printing the intermediate image becomes higher as approaching closer to the second partial image.

7. The image processing apparatus according to claim 1, wherein the first condition includes:

a condition indicating that the color difference pixels are present within a first determination area set within the first partial image;

a condition indicating that the color difference pixels are present in a second determination area set within the second partial image, and a condition indicating that the color difference pixels are present in an intermediate determination area set within the intermediate image.

8. The image processing apparatus according to claim 7, wherein the first determination area is a partial area of the first partial image, and is an area set along a boundary between the first partial image and the intermediate image; and the second determination area is a partial area of the second partial image, and is an area set along a boundary between the second partial image and the intermediate image.

9. A non-transitory and computer-readable medium storing a program which is executable by a controller for a print executor having a head, the head including a first nozzle configured to discharge a first ink and a second nozzle configured to discharge a second ink, a kind of the first ink and a kind of the second ink being different from each other, a position of the first nozzle in a first direction and a position of the second nozzle in the first direction being different from each other, the print executor being configured to perform a printing by repeatedly executing a partial printing and a medium conveyance, the partial printing including forming a dot on a print medium by the head while performing a head movement of moving the head relative to the print medium in the first direction or in a second direction opposite to the first direction, the medium conveyance including conveying the print medium relative to the head in a medium conveyance direction crossing the first direction, the program causing the controller to execute:

an image obtaining processing of obtaining an object image data indicating an object image;

a direction determining processing of determining, based on the object image data indicating the object image, a direction of the head movement in each of a plurality of times of the partial printing including a first partial printing and a second partial printing to be executed after the first partial printing to be the first direction or the second direction; and a print control processing of causing the print executor to print the object image by causing the print executor to execute the plurality of times of the partial printing based on the object image data, the direction of the head movement in each of the plurality of times of the partial printing being the direction determined by the direction determining processing, wherein;

the object image includes a first partial image to be printed by the first partial printing, a second partial image to be printed by the second partial printing, and an intermediate image positioned between the first partial image and the second partial image, the intermediate image being to be printed by both of the first partial printing and the second partial printing;

the direction determining processing including:

determining whether a specified condition including at least a first condition is satisfied, the first condition indicating that color difference pixels are present in both of the first partial image and the intermediate image, as well as the color difference pixels are present in both of the second partial image and the intermediate image;

determining the direction of the head movement in the first partial printing and the direction of the head movement in the second partial printing to be same as each other in a case that the specified condition is satisfied, and determining the direction of the head movement in the second partial printing to be opposite to the direction of the head movement in the first partial printing in a case that the specified condition is not satisfied, each of the color difference pixels is a pixel having larger difference between a color printed by the partial printing while moving the head in the first direction and a color printed by the partial printing while moving the head in the second direction, compared to pixel different from the color difference pixels.

10. A method for a print executor having a head, the head including a first nozzle configured to discharge a first ink and a second nozzle configured to discharge a second ink, a kind of the first ink and a kind of the second ink being different from each other, a position of the first nozzle in a first direction and a position of the second nozzle in the first direction being different from each other, the print executor being configured to perform a printing by repeatedly executing a partial printing and a medium conveyance, the partial printing including forming a dot on a print medium by the head while performing a head movement of moving the head relative to the print medium in the first direction or in a second direction opposite to the first direction, the medium conveyance including conveying the print medium relative to the head in a medium conveyance direction crossing the first direction, the method comprising:

obtaining an object image data indicating an object image;

determining, based on the object image data indicating the object image, a direction of the head movement in each of a plurality of times of the partial printing including a first partial printing and a second partial printing to be executed after the first partial printing to be the first direction or the second direction; and causing the print executor to print the object image by causing the print executor to execute the plurality of times of the partial printing based on the object image data, the direction of the head movement in each of the plurality of times of the partial printing being the direction determined by the determining of the direction of the head movement, wherein;

the object image includes a first partial image to be printed by the first partial printing, a second partial image to be printed by the second partial printing, and an intermediate image positioned between the first partial image and the second partial image, the intermediate image being to be printed by both of the first partial printing and the second partial printing;

the determining of the direction of the head movement including:

determining whether a specified condition including at least a first condition is satisfied, the first condition indicating that color difference pixels are present in both of the first partial image and the intermediate image, as well as the color difference pixels are present in both of the second partial image and the intermediate image;

determining the direction of the head movement in the first partial printing and the direction of the head movement in the second partial printing to be same as each other in a case that the specified condition is satisfied, and determining the direction of the head movement in the second partial printing to be opposite to the direction of the head movement in the first partial printing in a case that the specified condition is not satisfied, each of the color difference pixels is a pixel having larger difference between a color printed by the partial printing while moving the head in the first direction and a color printed by the partial printing while moving the head in the second direction, compared to pixel different from the color difference pixels.

\* \* \* \* \*